US008236443B2

(12) United States Patent
Snyder et al.

(10) Patent No.: US 8,236,443 B2
(45) Date of Patent: Aug. 7, 2012

(54) METAL FILM ENCAPSULATION

(75) Inventors: Shawn W. Snyder, Golden, CO (US); Bernd J. Neudecker, Littleton, CO (US); Paul C. Brantner, Conifer, CO (US)

(73) Assignee: Infinite Power Solutions, Inc., Littleton, CO (US)

( * ) Notice: Subject to any disclaimer, the term of this patent is extended or adjusted under 35 U.S.C. 154(b) by 1242 days.

(21) Appl. No.: 11/687,032

(22) Filed: Mar. 16, 2007

(65) Prior Publication Data

US 2007/0202395 A1  Aug. 30, 2007

Related U.S. Application Data

(63) Continuation-in-part of application No. 11/561,277, filed on Nov. 17, 2006, and a continuation-in-part of application No. 11/209,536, filed on Aug. 23, 2005, which is a continuation of application No. 11/374,282, filed on Jun. 15, 2005.

(60) Provisional application No. 60/782,792, filed on Mar. 16, 2006, provisional application No. 60/737,613, filed on Nov. 17, 2005, provisional application No. 60/759,479, filed on Jan. 17, 2006.

(51) Int. Cl.
*H01M 2/18* (2006.01)
(52) U.S. Cl. .................. 429/136; 429/129; 429/246
(58) Field of Classification Search .......... None
See application file for complete search history.

(56) References Cited

U.S. PATENT DOCUMENTS

| 712,316 A | 10/1902 | Loppe et al. |
| 2,970,180 A * | 1/1961 | Urry ............ 429/118 |
| 3,616,403 A | 10/1971 | Collins et al. |
| 3,790,432 A | 2/1974 | Fletcher et al. |
| 3,797,091 A | 3/1974 | Gavin |
| 3,850,604 A | 11/1974 | Klein |
| 3,939,008 A | 2/1976 | Longo et al. |
| 4,082,569 A | 4/1978 | Evans, Jr. |
| 4,111,523 A | 9/1978 | Kaminow et al. |
| 4,127,424 A | 11/1978 | Ullery, Jr. |
| 4,226,924 A | 10/1980 | Kimura et al. |
| 4,283,216 A | 8/1981 | Brereton |
| 4,318,938 A | 3/1982 | Barnett et al. |
| 4,328,297 A | 5/1982 | Bilhorn |

(Continued)

FOREIGN PATENT DOCUMENTS

CN    1415124    4/2003

(Continued)

OTHER PUBLICATIONS

Affinito, J.D. et al., "PML/oxide/PML barrier layer performance differences arising from use of UV or electron beam polymerization of the PML layers," Thin Solid Films 308-309: 19-25 (1997).

(Continued)

*Primary Examiner* — Cynthia Lee
(74) *Attorney, Agent, or Firm* — Fox Rothschild LLP; Jeff E. Schwartz

(57) ABSTRACT

The present invention relates to metal foil encapsulation of an electrochemical device. The metal foil encapsulation may also provide contact tabs for the electrochemical device. The present invention may also include a selectively conductive bonding layer between a contact and a cell structure.

45 Claims, 15 Drawing Sheets

U.S. PATENT DOCUMENTS

| | | | |
|---|---|---|---|
| 4,395,713 A | 7/1983 | Nelson et al. | |
| 4,437,966 A | 3/1984 | Hope et al. | |
| 4,442,144 A | 4/1984 | Pipkin | |
| 4,467,236 A | 8/1984 | Kolm et al. | |
| 4,481,265 A | 11/1984 | Ezawa et al. | |
| 4,518,661 A | 5/1985 | Rippere | |
| 4,555,456 A | 11/1985 | Kanehori et al. | |
| 4,572,873 A | 2/1986 | Kanehori et al. | |
| 4,587,225 A | 5/1986 | Tsukuma et al. | |
| 4,619,680 A | 10/1986 | Nourshargh et al. | |
| 4,645,726 A | 2/1987 | Hiratani et al. | |
| 4,664,993 A | 5/1987 | Sturgis et al. | |
| 4,668,593 A | 5/1987 | Sammells | |
| RE32,449 E | 6/1987 | Claussen | |
| 4,672,586 A | 6/1987 | Shimohigashi et al. | |
| 4,710,940 A | 12/1987 | Sipes, Jr. | |
| 4,728,588 A | 3/1988 | Noding et al. | |
| 4,740,431 A | 4/1988 | Little | |
| 4,756,717 A | 7/1988 | Sturgis et al. | |
| 4,785,459 A | 11/1988 | Baer | |
| 4,826,743 A | 5/1989 | Nazri | |
| 4,865,428 A | 9/1989 | Corrigan | |
| 4,878,094 A | 10/1989 | Balkanski | |
| 4,903,326 A | 2/1990 | Zakman et al. | |
| 4,915,810 A | 4/1990 | Kestigian et al. | |
| 4,964,877 A | 10/1990 | Keister et al. | |
| 4,977,007 A | 12/1990 | Kondo et al. | |
| 4,978,437 A | 12/1990 | Wirz | |
| 5,006,737 A | 4/1991 | Fay | |
| 5,019,467 A | 5/1991 | Fujiwara | |
| 5,030,331 A | 7/1991 | Sato | |
| 5,035,965 A | 7/1991 | Sangyoji et al. | |
| 5,055,704 A | 10/1991 | Link et al. | |
| 5,057,385 A | 10/1991 | Hope et al. | |
| 5,085,904 A | 2/1992 | Deak et al. | |
| 5,096,852 A | 3/1992 | Hobson | |
| 5,100,821 A | 3/1992 | Fay | |
| 5,107,538 A | 4/1992 | Benton et al. | |
| 5,110,694 A | 5/1992 | Nagasubramanian et al. | |
| 5,110,696 A | 5/1992 | Shokoohi et al. | |
| 5,119,269 A | 6/1992 | Nakayama | |
| 5,119,460 A | 6/1992 | Bruce et al. | |
| 5,124,782 A | 6/1992 | Hundt et al. | |
| 5,147,985 A | 9/1992 | DuBrucq | |
| 5,153,710 A | 10/1992 | McCain | |
| 5,169,408 A | 12/1992 | Biggerstaff et al. | |
| 5,171,413 A | 12/1992 | Arntz et al. | |
| 5,173,271 A | 12/1992 | Chen et al. | |
| 5,174,876 A | 12/1992 | Buchal et al. | |
| 5,180,645 A | 1/1993 | Moré | |
| 5,187,564 A | 2/1993 | McCain | |
| 5,196,041 A | 3/1993 | Tumminelli et al. | |
| 5,196,374 A | 3/1993 | Hundt et al. | |
| 5,200,029 A | 4/1993 | Bruce et al. | |
| 5,202,201 A | 4/1993 | Meunier et al. | |
| 5,206,925 A | 4/1993 | Nakazawa et al. | |
| 5,208,121 A | 5/1993 | Yahnke et al. | |
| 5,217,828 A | 6/1993 | Sangyoji et al. | |
| 5,221,891 A | 6/1993 | Janda et al. | |
| 5,225,288 A | 7/1993 | Beeson et al. | |
| 5,227,264 A | 7/1993 | Duval et al. | |
| 5,237,439 A | 8/1993 | Misono et al. | |
| 5,252,194 A | 10/1993 | Demaray et al. | |
| 5,262,254 A | 11/1993 | Koksbang et al. | |
| 5,273,608 A | 12/1993 | Nath | |
| 5,287,427 A | 2/1994 | Atkins et al. | |
| 5,296,089 A | 3/1994 | Chen et al. | |
| 5,300,461 A | 4/1994 | Ting | |
| 5,302,474 A | 4/1994 | Shackle | |
| 5,303,319 A | 4/1994 | Ford et al. | |
| 5,306,569 A | 4/1994 | Hiraki | |
| 5,307,240 A | 4/1994 | McMahon | |
| 5,309,302 A | 5/1994 | Vollmann | |
| 5,314,765 A * | 5/1994 | Bates | 429/231.95 |
| 5,326,652 A | 7/1994 | Lake | |
| 5,326,653 A | 7/1994 | Chang | |
| 5,338,624 A | 8/1994 | Gruenstern et al. | |
| 5,338,625 A | 8/1994 | Bates et al. | |
| 5,342,709 A | 8/1994 | Yahnke et al. | |
| 5,355,089 A | 10/1994 | Treger et al. | |
| 5,360,686 A | 11/1994 | Peled et al. | |
| 5,362,579 A | 11/1994 | Rossoll et al. | |
| 5,381,262 A | 1/1995 | Arima et al. | |
| 5,387,482 A | 2/1995 | Anani | |
| 5,401,595 A | 3/1995 | Kagawa et al. | |
| 5,403,680 A | 4/1995 | Otagawa et al. | |
| 5,411,537 A | 5/1995 | Munshi et al. | |
| 5,411,592 A | 5/1995 | Ovshinsky et al. | |
| 5,419,982 A | 5/1995 | Tura et al. | |
| 5,427,669 A | 6/1995 | Drummond | |
| 5,435,826 A | 7/1995 | Sakakibara et al. | |
| 5,437,692 A | 8/1995 | Dasgupta et al. | |
| 5,445,856 A | 8/1995 | Chaloner-Gill | |
| 5,445,906 A | 8/1995 | Hobson et al. | |
| 5,448,110 A | 9/1995 | Tuttle et al. | |
| 5,449,576 A | 9/1995 | Anani | |
| 5,455,126 A | 10/1995 | Bates et al. | |
| 5,457,569 A | 10/1995 | Liou et al. | |
| 5,458,995 A | 10/1995 | Behl et al. | |
| 5,464,706 A | 11/1995 | Dasgupta et al. | |
| 5,470,396 A | 11/1995 | Mongon et al. | |
| 5,472,795 A | 12/1995 | Atita | |
| 5,475,528 A | 12/1995 | LaBorde | |
| 5,478,456 A | 12/1995 | Humpal et al. | |
| 5,483,613 A | 1/1996 | Bruce et al. | |
| 5,493,177 A | 2/1996 | Muller et al. | |
| 5,498,489 A | 3/1996 | Dasgupta et al. | |
| 5,499,207 A | 3/1996 | Miki et al. | |
| 5,501,918 A | 3/1996 | Gruenstern et al. | |
| 5,504,041 A | 4/1996 | Summerfelt | |
| 5,512,147 A | 4/1996 | Bates et al. | |
| 5,512,387 A | 4/1996 | Ovshinsky | |
| 5,512,389 A | 4/1996 | Dasgupta et al. | |
| 5,538,796 A | 7/1996 | Schaffer et al. | |
| 5,540,742 A | 7/1996 | Sangyoji et al. | |
| 5,547,780 A | 8/1996 | Kagawa et al. | |
| 5,547,782 A | 8/1996 | Dasgupta et al. | |
| 5,552,242 A | 9/1996 | Ovshinsky et al. | |
| 5,555,127 A | 9/1996 | Abdelkader et al. | |
| 5,561,004 A | 10/1996 | Bates et al. | |
| 5,563,979 A | 10/1996 | Bruce et al. | |
| 5,565,071 A | 10/1996 | Demaray et al. | |
| 5,567,210 A | 10/1996 | Bates et al. | |
| 5,569,520 A | 10/1996 | Bates | |
| 5,582,935 A | 12/1996 | Dasgupta et al. | |
| 5,591,520 A | 1/1997 | Migliorini et al. | |
| 5,597,660 A | 1/1997 | Bates et al. | |
| 5,597,661 A | 1/1997 | Takeuchi et al. | |
| 5,599,355 A | 2/1997 | Nagasubramanian et al. | |
| 5,601,952 A | 2/1997 | Dasgupta et al. | |
| 5,603,816 A | 2/1997 | Demaray et al. | |
| 5,607,560 A | 3/1997 | Hirabayashi et al. | |
| 5,607,789 A | 3/1997 | Treger et al. | |
| 5,612,152 A | 3/1997 | Bates et al. | |
| 5,612,153 A | 3/1997 | Moulton et al. | |
| 5,613,995 A | 3/1997 | Bhandarkar et al. | |
| 5,616,933 A | 4/1997 | Li | |
| 5,618,382 A | 4/1997 | Mintz et al. | |
| 5,625,202 A | 4/1997 | Chai | |
| 5,637,418 A | 6/1997 | Brown et al. | |
| 5,643,480 A | 7/1997 | Gustavsson et al. | |
| 5,644,207 A | 7/1997 | Lew et al. | |
| 5,645,626 A | 7/1997 | Edlund et al. | |
| 5,645,960 A | 7/1997 | Scrosati et al. | |
| 5,654,054 A | 8/1997 | Tropsha et al. | |
| 5,654,984 A | 8/1997 | Hershbarger et al. | |
| 5,658,652 A | 8/1997 | Sellergren | |
| 5,660,700 A | 8/1997 | Shimizu et al. | |
| 5,665,490 A | 9/1997 | Takeuchi et al. | |
| 5,667,538 A | 9/1997 | Bailey | |
| 5,677,784 A | 10/1997 | Harris | |
| 5,679,980 A | 10/1997 | Summerfelt | |
| 5,681,666 A | 10/1997 | Treger et al. | |
| 5,686,360 A | 11/1997 | Harvey, III et al. | |
| 5,689,522 A | 11/1997 | Beach | |
| 5,693,956 A | 12/1997 | Shi et al. | |
| 5,702,829 A | 12/1997 | Paidassi et al. | |

| | | | | | |
|---|---|---|---|---|---|
| 5,705,293 A | 1/1998 | Hobson | 6,045,942 A | 4/2000 | Miekka et al. |
| 5,716,728 A | 2/1998 | Smesko | 6,046,081 A | 4/2000 | Kuo |
| 5,718,813 A | 2/1998 | Drummond et al. | 6,046,514 A | 4/2000 | Rouillard et al. |
| 5,719,976 A | 2/1998 | Henry et al. | 6,048,372 A | 4/2000 | Mangahara et al. |
| 5,721,067 A | 2/1998 | Jacobs et al. | 6,051,114 A | 4/2000 | Yao et al. |
| RE35,746 E | 3/1998 | Lake | 6,051,296 A | 4/2000 | McCaulley et al. |
| 5,731,661 A | 3/1998 | So et al. | 6,052,397 A | 4/2000 | Jeon et al. |
| 5,738,731 A | 4/1998 | Shindo et al. | 6,057,557 A | 5/2000 | Ichikawa |
| 5,742,094 A | 4/1998 | Ting | 6,058,233 A | 5/2000 | Dragone |
| 5,755,938 A | 5/1998 | Fukui et al. | 6,071,323 A | 6/2000 | Kawaguchi |
| 5,755,940 A | 5/1998 | Shindo | 6,075,973 A | 6/2000 | Greeff et al. |
| 5,757,126 A | 5/1998 | Harvey, III et al. | 6,077,106 A | 6/2000 | Mish |
| 5,762,768 A | 6/1998 | Goy et al. | 6,077,642 A | 6/2000 | Ogata et al. |
| 5,763,058 A | 6/1998 | Isen et al. | 6,078,791 A | 6/2000 | Tuttle et al. |
| 5,771,562 A | 6/1998 | Harvey, III et al. | 6,080,508 A | 6/2000 | Dasgupta et al. |
| 5,776,278 A | 7/1998 | Tuttle et al. | 6,080,643 A | 6/2000 | Noguchi et al. |
| 5,779,839 A | 7/1998 | Tuttle et al. | 6,093,944 A | 7/2000 | VanDover |
| 5,790,489 A | 8/1998 | O'Connor | 6,094,292 A | 7/2000 | Goldner et al. |
| 5,792,550 A | 8/1998 | Phillips et al. | 6,096,569 A | 8/2000 | Matsuno et al. |
| 5,805,223 A | 9/1998 | Shikakura et al. | 6,100,108 A | 8/2000 | Mizuno et al. |
| 5,811,177 A | 9/1998 | Shi et al. | 6,106,933 A | 8/2000 | Nagai et al. |
| 5,814,195 A | 9/1998 | Lehan et al. | 6,110,531 A | 8/2000 | Paz De Araujo |
| 5,830,330 A | 11/1998 | Lantsman | 6,115,616 A | 9/2000 | Halperin et al. |
| 5,831,262 A | 11/1998 | Greywall et al. | 6,117,279 A | 9/2000 | Smolanoff et al. |
| 5,834,137 A | 11/1998 | Zhang et al. | 6,118,426 A | 9/2000 | Albert et al. |
| 5,841,931 A | 11/1998 | Foresi et al. | 6,120,890 A | 9/2000 | Chen et al. |
| 5,842,118 A | 11/1998 | Wood, Jr. | 6,129,277 A | 10/2000 | Grant et al. |
| 5,845,990 A | 12/1998 | Hymer | 6,133,670 A | 10/2000 | Rodgers et al. |
| 5,847,865 A | 12/1998 | Gopinath et al. | 6,137,671 A | 10/2000 | Staffiere |
| 5,849,163 A | 12/1998 | Ichikawa et al. | 6,144,916 A | 11/2000 | Wood, Jr. et al. |
| 5,851,896 A | 12/1998 | Summerfelt | 6,146,225 A | 11/2000 | Sheats et al. |
| 5,853,830 A | 12/1998 | McCaulley et al. | 6,148,503 A | 11/2000 | Delnick et al. |
| 5,855,744 A | 1/1999 | Halsey et al. | 6,156,452 A | 12/2000 | Kozuki et al. |
| 5,856,705 A | 1/1999 | Ting | 6,157,765 A | 12/2000 | Bruce et al. |
| 5,864,182 A | 1/1999 | Matsuzaki | 6,159,635 A | 12/2000 | Dasgupta et al. |
| 5,865,860 A | 2/1999 | Delnick | 6,160,373 A | 12/2000 | Dunn et al. |
| 5,870,273 A | 2/1999 | Sogabe et al. | 6,162,709 A | 12/2000 | Raoux et al. |
| 5,874,184 A | 2/1999 | Takeuchi et al. | 6,165,566 A | 12/2000 | Tropsha |
| 5,882,721 A | 3/1999 | Delnick | 6,168,884 B1 | 1/2001 | Neudecker et al. |
| 5,882,946 A | 3/1999 | Otani | 6,169,474 B1 | 1/2001 | Greeff et al. |
| 5,889,383 A | 3/1999 | Teich | 6,175,075 B1 | 1/2001 | Shiotsuka et al. |
| 5,895,731 A | 4/1999 | Clingempeel | 6,176,986 B1 | 1/2001 | Watanabe et al. |
| 5,897,522 A | 4/1999 | Nitzan | 6,181,283 B1 | 1/2001 | Johnson et al. |
| 5,900,057 A | 5/1999 | Buchal et al. | 6,192,222 B1 | 2/2001 | Greeff et al. |
| 5,909,346 A | 6/1999 | Malhotra et al. | 6,197,167 B1 | 3/2001 | Tanaka |
| 5,916,704 A | 6/1999 | Lewin et al. | 6,198,217 B1 | 3/2001 | Suzuki et al. |
| 5,923,964 A | 7/1999 | Li | 6,204,111 B1 | 3/2001 | Uemoto et al. |
| 5,930,046 A | 7/1999 | Solberg et al. | 6,210,544 B1 | 4/2001 | Sasaki |
| 5,930,584 A | 7/1999 | Sun et al. | 6,210,832 B1 | 4/2001 | Visco et al. |
| 5,942,089 A | 8/1999 | Sproul et al. | 6,214,061 B1 | 4/2001 | Visco et al. |
| 5,948,215 A | 9/1999 | Lantsmann | 6,214,660 B1 | 4/2001 | Uemoto et al. |
| 5,948,464 A | 9/1999 | Delnick | 6,218,049 B1 | 4/2001 | Bates et al. |
| 5,948,562 A | 9/1999 | Fulcher et al. | 6,220,516 B1 | 4/2001 | Tuttle et al. |
| 5,952,778 A | 9/1999 | Haskal et al. | 6,223,317 B1 | 4/2001 | Pax et al. |
| 5,955,217 A | 9/1999 | Lerberghe | 6,228,532 B1 | 5/2001 | Tsuji et al. |
| 5,961,672 A | 10/1999 | Skotheim et al. | 6,229,987 B1 | 5/2001 | Greeff et al. |
| 5,961,682 A | 10/1999 | Lee et al. | 6,232,242 B1 | 5/2001 | Hata et al. |
| 5,966,491 A | 10/1999 | DiGiovanni | 6,235,432 B1 | 5/2001 | Kono et al. |
| 5,970,393 A | 10/1999 | Khorrami et al. | 6,236,793 B1 | 5/2001 | Lawrence et al. |
| 5,973,913 A | 10/1999 | McEwen et al. | 6,242,128 B1 | 6/2001 | Tura et al. |
| 5,977,582 A | 11/1999 | Fleming et al. | 6,242,129 B1 | 6/2001 | Johnson |
| 5,982,144 A | 11/1999 | Johnson et al. | 6,242,132 B1 | 6/2001 | Neudecker et al. |
| 5,985,484 A | 11/1999 | Young et al. | 6,248,291 B1 | 6/2001 | Nakagama et al. |
| 5,985,485 A | 11/1999 | Ovshinsky et al. | 6,248,481 B1 | 6/2001 | Visco et al. |
| 6,000,603 A | 12/1999 | Koskenmaki et al. | 6,248,640 B1 | 6/2001 | Nam |
| 6,001,224 A | 12/1999 | Drummond et al. | 6,249,222 B1 | 6/2001 | Gehlot |
| 6,004,660 A | 12/1999 | Topolski et al. | 6,252,564 B1 | 6/2001 | Albert et al. |
| 6,007,945 A | 12/1999 | Jacobs et al. | 6,258,252 B1 | 7/2001 | Miyasaka et al. |
| 6,013,949 A | 1/2000 | Tuttle | 6,261,917 B1 | 7/2001 | Quek et al. |
| 6,019,284 A | 2/2000 | Freeman et al. | 6,264,709 B1 | 7/2001 | Yoon et al. |
| 6,023,610 A | 2/2000 | Wood, Jr. | 6,265,652 B1 | 7/2001 | Kurata et al. |
| 6,024,844 A | 2/2000 | Drummond et al. | 6,268,695 B1 | 7/2001 | Affinito |
| 6,025,094 A | 2/2000 | Visco et al. | 6,271,053 B1 | 8/2001 | Kondo |
| 6,028,990 A | 2/2000 | Shahani et al. | 6,271,793 B1 | 8/2001 | Brady et al. |
| 6,030,421 A | 2/2000 | Gauthier et al. | 6,271,801 B2 | 8/2001 | Tuttle et al. |
| 6,033,768 A | 3/2000 | Muenz et al. | 6,280,585 B1 | 8/2001 | Obinata |
| 6,042,965 A | 3/2000 | Nestler et al. | 6,280,875 B1 | 8/2001 | Kwak et al. |
| 6,045,626 A | 4/2000 | Yano et al. | 6,281,142 B1 | 8/2001 | Basceri |
| 6,045,652 A | 4/2000 | Tuttle et al. | 6,284,406 B1 | 9/2001 | Xing et al. |

| | | | | | |
|---|---|---|---|---|---|
| 6,287,986 B1 | 9/2001 | Mihara | 6,466,771 B2 | 10/2002 | Wood, Jr. |
| 6,289,209 B1 | 9/2001 | Wood, Jr. | 6,475,668 B2 | 11/2002 | Hosokawa et al. |
| 6,290,821 B1 | 9/2001 | McLeod | 6,480,699 B1 | 11/2002 | Lovoi |
| 6,290,822 B1 | 9/2001 | Fleming et al. | 6,481,623 B1 | 11/2002 | Grant et al. |
| 6,291,098 B1 | 9/2001 | Shibuya et al. | 6,488,822 B1 | 12/2002 | Moslehi |
| 6,294,722 B1 | 9/2001 | Kondo et al. | 6,494,999 B1 | 12/2002 | Herrera et al. |
| 6,296,949 B1 | 10/2001 | Bergstresser et al. | 6,495,283 B1 | 12/2002 | Yoon et al. |
| 6,296,967 B1 | 10/2001 | Jacobs et al. | 6,497,598 B2 | 12/2002 | Affinito |
| 6,296,971 B1 | 10/2001 | Hara | 6,500,287 B1 | 12/2002 | Azens et al. |
| 6,300,215 B1 | 10/2001 | Shin | 6,503,661 B1 | 1/2003 | Park et al. |
| 6,302,939 B1 | 10/2001 | Rabin | 6,503,831 B1 | 1/2003 | Speakman |
| 6,306,265 B1 | 10/2001 | Fu et al. | 6,506,289 B2 | 1/2003 | Demaray et al. |
| 6,316,563 B2 | 11/2001 | Naijo et al. | 6,511,516 B1 | 1/2003 | Johnson et al. |
| 6,323,416 B1 | 11/2001 | Komori et al. | 6,511,615 B1 | 1/2003 | Dawes et al. |
| 6,324,211 B1 | 11/2001 | Ovard et al. | 6,517,968 B2 | 2/2003 | Johnson et al. |
| 6,325,294 B2 | 12/2001 | Tuttle et al. | 6,522,067 B1 | 2/2003 | Graff et al. |
| 6,329,213 B1 | 12/2001 | Tuttle et al. | 6,524,466 B1 | 2/2003 | Bonaventura et al. |
| 6,339,236 B1 | 1/2002 | Tomii et al. | 6,524,750 B1 | 2/2003 | Mansuetto |
| 6,340,880 B1 | 1/2002 | Higashijima et al. | 6,525,976 B1 | 2/2003 | Johnson |
| 6,344,366 B1 | 2/2002 | Bates | 6,528,212 B1 | 3/2003 | Kusumoto et al. |
| 6,344,419 B1 | 2/2002 | Forster et al. | 6,529,827 B1 | 3/2003 | Beason et al. |
| 6,344,795 B1 | 2/2002 | Gehlot | 6,533,907 B2 | 3/2003 | Demaray et al. |
| 6,350,353 B2 | 2/2002 | Gopalraja et al. | 6,537,428 B1 | 3/2003 | Xiong et al. |
| 6,351,630 B2 | 2/2002 | Wood, Jr. | 6,538,211 B2 | 3/2003 | St. Lawrence et al. |
| 6,356,230 B1 | 3/2002 | Greef et al. | 6,541,147 B1 | 4/2003 | McLean et al. |
| 6,356,694 B1 | 3/2002 | Weber | 6,548,912 B1 | 4/2003 | Graff et al. |
| 6,356,764 B1 | 3/2002 | Ovard et al. | 6,551,745 B2 | 4/2003 | Moutsios et al. |
| 6,358,810 B1 | 3/2002 | Dornfest et al. | 6,558,836 B1 | 5/2003 | Whitacre et al. |
| 6,360,954 B1 | 3/2002 | Barnardo | 6,562,513 B1 | 5/2003 | Takeuchi et al. |
| 6,361,662 B1 | 3/2002 | Chiba et al. | 6,563,998 B2 | 5/2003 | Farah et al. |
| 6,365,300 B1 | 4/2002 | Ota et al. | 6,569,564 B1 | 5/2003 | Lane |
| 6,365,319 B1 | 4/2002 | Heath et al. | 6,570,325 B2 | 5/2003 | Graff et al. |
| 6,368,275 B1 | 4/2002 | Sliwa et al. | 6,572,173 B2 | 6/2003 | Muller |
| 6,369,316 B1 | 4/2002 | Plessing et al. | 6,573,652 B1 | 6/2003 | Graff et al. |
| 6,372,383 B1 | 4/2002 | Lee et al. | 6,576,546 B2 | 6/2003 | Gilbert et al. |
| 6,372,386 B1 | 4/2002 | Cho et al. | 6,579,728 B2 | 6/2003 | Grant et al. |
| 6,373,224 B1 | 4/2002 | Goto et al. | 6,582,480 B2 | 6/2003 | Pasquier et al. |
| 6,375,780 B1 | 4/2002 | Tuttle et al. | 6,582,481 B1 | 6/2003 | Erbil |
| 6,376,027 B1 | 4/2002 | Lee et al. | 6,582,852 B1 | 6/2003 | Gao et al. |
| 6,379,835 B1 | 4/2002 | Kucherovsky et al. | 6,589,299 B2 | 7/2003 | Missling et al. |
| 6,379,842 B1 | 4/2002 | Mayer | 6,593,150 B2 | 7/2003 | Ramberg et al. |
| 6,380,477 B1 | 4/2002 | Curtin | 6,599,662 B1 | 7/2003 | Chiang et al. |
| 6,384,573 B1 | 5/2002 | Dunn | 6,600,905 B2 | 7/2003 | Greeff et al. |
| 6,387,563 B1 | 5/2002 | Bates | 6,602,338 B2 | 8/2003 | Chen et al. |
| 6,391,166 B1 | 5/2002 | Wang | 6,603,139 B1 | 8/2003 | Tessler et al. |
| 6,392,565 B1 | 5/2002 | Brown | 6,603,391 B1 | 8/2003 | Greeff et al. |
| 6,394,598 B1 | 5/2002 | Kaiser | 6,605,228 B1 | 8/2003 | Kawaguchi et al. |
| 6,395,430 B1 | 5/2002 | Cho et al. | 6,608,464 B1 | 8/2003 | Lew et al. |
| 6,396,001 B1 | 5/2002 | Nakamura | 6,608,470 B1 | 8/2003 | Oglesbee et al. |
| 6,398,824 B1 | 6/2002 | Johnson | 6,610,440 B1 | 8/2003 | LaFollette et al. |
| 6,399,241 B1 | 6/2002 | Hara et al. | 6,615,614 B1 | 9/2003 | Makikawa et al. |
| 6,402,039 B1 | 6/2002 | Freeman et al. | 6,616,035 B2 | 9/2003 | Ehrensvard et al. |
| 6,402,795 B1 * | 6/2002 | Chu et al. .................... 29/623.5 | 6,618,829 B2 | 9/2003 | Pax et al. |
| 6,402,796 B1 | 6/2002 | Johnson | 6,620,545 B2 | 9/2003 | Goenka et al. |
| 6,409,965 B1 | 6/2002 | Nagata et al. | 6,622,049 B2 | 9/2003 | Penner et al. |
| 6,413,284 B1 | 7/2002 | Chu et al. | 6,632,563 B1 | 10/2003 | Krasnov et al. |
| 6,413,285 B1 | 7/2002 | Chu et al. | 6,637,906 B2 | 10/2003 | Knoerzer et al. |
| 6,413,382 B1 | 7/2002 | Wang et al. | 6,637,916 B2 | 10/2003 | Mullner |
| 6,413,645 B1 | 7/2002 | Graff et al. | 6,639,578 B1 | 10/2003 | Comiskey et al. |
| 6,413,676 B1 | 7/2002 | Munshi | 6,642,895 B2 | 11/2003 | Zurcher et al. |
| 6,414,626 B1 | 7/2002 | Greef et al. | 6,645,675 B1 | 11/2003 | Munshi |
| 6,416,598 B1 | 7/2002 | Sircar | 6,650,000 B2 | 11/2003 | Ballantine et al. |
| 6,420,961 B1 | 7/2002 | Bates et al. | 6,650,942 B2 | 11/2003 | Howard et al. |
| 6,422,698 B2 | 7/2002 | Kaiser | 6,662,430 B2 | 12/2003 | Brady et al. |
| 6,423,106 B1 | 7/2002 | Bates | 6,664,006 B1 | 12/2003 | Munshi |
| 6,423,776 B1 | 7/2002 | Akkapeddi et al. | 6,673,484 B2 | 1/2004 | Matsuura |
| 6,426,163 B1 | 7/2002 | Pasquier et al. | 6,673,716 B1 | 1/2004 | D'Couto et al. |
| 6,432,577 B1 | 8/2002 | Shul et al. | 6,674,159 B1 | 1/2004 | Peterson et al. |
| 6,432,584 B1 | 8/2002 | Visco et al. | 6,677,070 B2 | 1/2004 | Kearl |
| 6,433,380 B2 | 8/2002 | Shin | 6,683,244 B2 | 1/2004 | Fujimori et al. |
| 6,433,465 B1 | 8/2002 | McKnight et al. | 6,683,749 B2 | 1/2004 | Daby et al. |
| 6,436,156 B1 | 8/2002 | Wandeloski et al. | 6,686,096 B1 | 2/2004 | Chung |
| 6,437,231 B2 | 8/2002 | Kurata et al. | 6,693,840 B2 | 2/2004 | Shimada et al. |
| 6,444,336 B1 | 9/2002 | Jia et al. | 6,700,491 B2 | 3/2004 | Shafer |
| 6,444,355 B1 | 9/2002 | Murai et al. | 6,706,449 B2 | 3/2004 | Mikhaylik et al. |
| 6,444,368 B1 | 9/2002 | Hikmet et al. | 6,709,778 B2 | 3/2004 | Johnson |
| 6,444,750 B1 | 9/2002 | Touhsaent | 6,713,216 B2 | 3/2004 | Kugai et al. |
| 6,459,418 B1 | 10/2002 | Comiskey et al. | 6,713,389 B2 | 3/2004 | Speakman |
| 6,459,726 B1 | 10/2002 | Ovard et al. | 6,713,987 B2 | 3/2004 | Krasnov et al. |

| Patent Number | Date | Inventor(s) |
|---|---|---|
| 6,723,140 B2 | 4/2004 | Chu et al. |
| 6,730,423 B2 | 5/2004 | Einhart et al. |
| 6,733,924 B1 | 5/2004 | Skotheim et al. |
| 6,737,197 B2 | 5/2004 | Chu et al. |
| 6,737,789 B2 | 5/2004 | Radziemski et al. |
| 6,741,178 B1 | 5/2004 | Tuttle |
| 6,750,156 B1 | 6/2004 | Le et al. |
| 6,752,842 B2 | 6/2004 | Luski et al. |
| 6,753,108 B1 | 6/2004 | Hampden-Smith et al. |
| 6,753,114 B2 | 6/2004 | Jacobs et al. |
| 6,760,520 B1 | 7/2004 | Medin et al. |
| 6,764,525 B1 | 7/2004 | Whitacre et al. |
| 6,768,246 B2 | 7/2004 | Pelrine et al. |
| 6,768,855 B1 | 7/2004 | Bakke et al. |
| 6,770,176 B2 | 8/2004 | Benson et al. |
| 6,773,848 B1 | 8/2004 | Nortoft et al. |
| 6,780,208 B2 | 8/2004 | Hopkins et al. |
| 6,797,428 B1 | 9/2004 | Skotheim et al. |
| 6,797,429 B1 | 9/2004 | Komatsu |
| 6,805,998 B2 | 10/2004 | Jenson et al. |
| 6,805,999 B2 | 10/2004 | Lee et al. |
| 6,818,356 B1 | 11/2004 | Bates |
| 6,822,157 B2 | 11/2004 | Fujioka |
| 6,824,922 B2 | 11/2004 | Park et al. |
| 6,827,826 B2 | 12/2004 | Demaray et al. |
| 6,828,063 B2 | 12/2004 | Park et al. |
| 6,828,065 B2 | 12/2004 | Munshi |
| 6,830,846 B2 | 12/2004 | Kramlich et al. |
| 6,835,493 B2 | 12/2004 | Zhang et al. |
| 6,838,209 B2 | 1/2005 | Langan et al. |
| 6,846,765 B2 | 1/2005 | Imamura et al. |
| 6,852,139 B2 | 2/2005 | Zhang et al. |
| 6,855,441 B1 | 2/2005 | Levanon |
| 6,861,821 B2 * | 3/2005 | Masumoto et al. ............ 320/107 |
| 6,863,699 B1 | 3/2005 | Krasnov et al. |
| 6,866,901 B2 | 3/2005 | Burrows et al. |
| 6,866,963 B2 | 3/2005 | Seung et al. |
| 6,869,722 B2 | 3/2005 | Kearl |
| 6,884,327 B2 | 4/2005 | Pan et al. |
| 6,886,240 B2 | 5/2005 | Zhang et al. |
| 6,896,992 B2 | 5/2005 | Kearl |
| 6,899,975 B2 | 5/2005 | Watanabe et al. |
| 6,902,660 B2 | 6/2005 | Lee et al. |
| 6,905,578 B1 | 6/2005 | Moslehi et al. |
| 6,906,436 B2 | 6/2005 | Jenson et al. |
| 6,911,667 B2 | 6/2005 | Pichler et al. |
| 6,916,679 B2 | 7/2005 | Snyder et al. |
| 6,921,464 B2 | 7/2005 | Krasnov et al. |
| 6,923,702 B2 | 8/2005 | Graff et al. |
| 6,924,164 B2 | 8/2005 | Jenson |
| 6,929,879 B2 | 8/2005 | Yamazaki |
| 6,936,377 B2 | 8/2005 | Wensley et al. |
| 6,936,381 B2 | 8/2005 | Skotheim et al. |
| 6,936,407 B2 | 8/2005 | Pichler |
| 6,949,389 B2 | 9/2005 | Pichler et al. |
| 6,955,986 B2 | 10/2005 | Li |
| 6,962,613 B2 | 11/2005 | Jenson |
| 6,962,671 B2 | 11/2005 | Martin et al. |
| 6,964,829 B2 | 11/2005 | Utsugi et al. |
| 6,982,132 B1 | 1/2006 | Goldner et al. |
| 6,986,965 B2 | 1/2006 | Jenson et al. |
| 6,994,933 B1 | 2/2006 | Bates |
| 7,022,431 B2 | 4/2006 | Shchori et al. |
| 7,033,406 B2 | 4/2006 | Weir et al. |
| 7,045,246 B2 | 5/2006 | Simburger et al. |
| 7,045,372 B2 | 5/2006 | Ballantine et al. |
| 7,056,620 B2 | 6/2006 | Krasnov et al. |
| 7,073,723 B2 | 7/2006 | Fürst et al. |
| 7,095,372 B2 | 8/2006 | Soler Castany et al. |
| 7,129,166 B2 | 10/2006 | Speakman |
| 7,131,189 B2 | 11/2006 | Jenson |
| 7,144,654 B2 | 12/2006 | LaFollette et al. |
| 7,144,655 B2 | 12/2006 | Jenson et al. |
| 7,157,187 B2 | 1/2007 | Jenson |
| 7,158,031 B2 | 1/2007 | Tuttle |
| 7,162,392 B2 | 1/2007 | Vock et al. |
| 7,183,693 B2 | 2/2007 | Brantner et al. |
| 7,186,479 B2 | 3/2007 | Krasnov et al. |
| 7,194,801 B2 | 3/2007 | Jenson et al. |
| 7,198,832 B2 | 4/2007 | Burrows et al. |
| 7,202,825 B2 | 4/2007 | Leizerovich et al. |
| 7,220,517 B2 | 5/2007 | Park et al. |
| 7,230,321 B2 | 6/2007 | McCain |
| 7,247,408 B2 | 7/2007 | Skotheim et al. |
| 7,253,494 B2 | 8/2007 | Mino et al. |
| 7,265,674 B2 | 9/2007 | Tuttle |
| 7,267,904 B2 | 9/2007 | Komatsu et al. |
| 7,267,906 B2 | 9/2007 | Mizuta et al. |
| 7,273,682 B2 | 9/2007 | Park et al. |
| 7,274,118 B2 | 9/2007 | Jenson et al. |
| 7,288,340 B2 | 10/2007 | Iwamoto |
| 7,316,867 B2 | 1/2008 | Park et al. |
| 7,323,634 B2 | 1/2008 | Speakman |
| 7,332,363 B2 | 2/2008 | Edwards |
| 7,335,441 B2 | 2/2008 | Luski et al. |
| RE40,137 E | 3/2008 | Tuttle et al. |
| 7,345,647 B1 | 3/2008 | Rodenbeck |
| 7,348,099 B2 | 3/2008 | Mukai et al. |
| 7,389,580 B2 | 6/2008 | Jenson et al. |
| 7,400,253 B2 | 7/2008 | Cohen |
| 7,410,730 B2 | 8/2008 | Bates |
| RE40,531 E | 10/2008 | Graff et al. |
| 7,466,274 B2 | 12/2008 | Lin et al. |
| 7,468,221 B2 | 12/2008 | LaFollette et al. |
| 7,494,742 B2 | 2/2009 | Tarnowski et al. |
| 7,670,724 B1 * | 3/2010 | Chan et al. .................... 429/248 |
| 7,848,715 B2 | 12/2010 | Boos |
| 7,858,223 B2 | 12/2010 | Visco et al. |
| 8,010,048 B2 | 8/2011 | Brommer et al. |
| 8,056,814 B2 | 11/2011 | Martin et al. |
| 2001/0027159 A1 | 10/2001 | Kaneyoshi |
| 2001/0031122 A1 | 10/2001 | Lackritz et al. |
| 2001/0032666 A1 | 10/2001 | Jenson et al. |
| 2001/0033952 A1 | 10/2001 | Jenson et al. |
| 2001/0034106 A1 | 10/2001 | Moise et al. |
| 2001/0041294 A1 | 11/2001 | Chu et al. |
| 2001/0041460 A1 | 11/2001 | Wiggins |
| 2001/0052752 A1 | 12/2001 | Ghosh et al. |
| 2001/0054437 A1 | 12/2001 | Komori et al. |
| 2001/0055719 A1 * | 12/2001 | Akashi et al. ................. 429/303 |
| 2002/0000034 A1 | 1/2002 | Jenson |
| 2002/0001746 A1 | 1/2002 | Jenson |
| 2002/0001747 A1 | 1/2002 | Jenson |
| 2002/0004167 A1 | 1/2002 | Jenson et al. |
| 2002/0009630 A1 | 1/2002 | Gao et al. |
| 2002/0019296 A1 | 2/2002 | Freeman et al. |
| 2002/0028377 A1 * | 3/2002 | Gross ............................ 429/129 |
| 2002/0033330 A1 | 3/2002 | Demaray et al. |
| 2002/0037756 A1 | 3/2002 | Jacobs et al. |
| 2002/0066539 A1 | 6/2002 | Muller |
| 2002/0067615 A1 | 6/2002 | Muller |
| 2002/0076133 A1 | 6/2002 | Li et al. |
| 2002/0091929 A1 | 7/2002 | Ehrensvard |
| 2002/0093029 A1 | 7/2002 | Ballantine et al. |
| 2002/0106297 A1 | 8/2002 | Ueno et al. |
| 2002/0110733 A1 | 8/2002 | Johnson |
| 2002/0115252 A1 | 8/2002 | Haukka et al. |
| 2002/0134671 A1 | 9/2002 | Demaray et al. |
| 2002/0139662 A1 | 10/2002 | Lee |
| 2002/0140103 A1 | 10/2002 | Kloster et al. |
| 2002/0159245 A1 | 10/2002 | Murasko et al. |
| 2002/0161404 A1 | 10/2002 | Schmidt |
| 2002/0164441 A1 | 11/2002 | Amine et al. |
| 2002/0170821 A1 | 11/2002 | Sandlin et al. |
| 2002/0170960 A1 | 11/2002 | Ehrensvard et al. |
| 2003/0019326 A1 | 1/2003 | Han et al. |
| 2003/0022487 A1 | 1/2003 | Yoon et al. |
| 2003/0024994 A1 | 2/2003 | Ladyansky |
| 2003/0029493 A1 | 2/2003 | Plessing |
| 2003/0035906 A1 | 2/2003 | Memarian et al. |
| 2003/0036003 A1 | 2/2003 | Shchori et al. |
| 2003/0042131 A1 | 3/2003 | Johnson |
| 2003/0044665 A1 | 3/2003 | Rastegar et al. |
| 2003/0048635 A1 | 3/2003 | Knoerzer et al. |
| 2003/0063883 A1 | 4/2003 | Demaray et al. |
| 2003/0064292 A1 | 4/2003 | Neudecker et al. |
| 2003/0068559 A1 | 4/2003 | Armstrong et al. |
| 2003/0076642 A1 | 4/2003 | Shiner et al. |

| | | | | | | |
|---|---|---|---|---|---|---|
| 2003/0077914 A1 | 4/2003 | Le et al. | | 2005/0208371 A1 | 9/2005 | Kim et al. |
| 2003/0079838 A1 | 5/2003 | Brcka | | 2005/0239917 A1 | 10/2005 | Nelson et al. |
| 2003/0091904 A1 | 5/2003 | Munshi | | 2005/0255828 A1 | 11/2005 | Fisher |
| 2003/0095463 A1 | 5/2003 | Shimada et al. | | 2005/0266161 A1 | 12/2005 | Medeiros et al. |
| 2003/0097858 A1 | 5/2003 | Strohhofer et al. | | 2006/0019504 A1 | 1/2006 | Taussig |
| 2003/0109903 A1 | 6/2003 | Berrang et al. | | 2006/0021214 A1 | 2/2006 | Jenson et al. |
| 2003/0127319 A1 | 7/2003 | Demaray et al. | | 2006/0021261 A1 | 2/2006 | Face |
| 2003/0134054 A1 | 7/2003 | Demaray et al. | | 2006/0040177 A1 | 2/2006 | Onodera et al. |
| 2003/0141186 A1 | 7/2003 | Wang et al. | | 2006/0046907 A1 | 3/2006 | Rastegar et al. |
| 2003/0143853 A1 | 7/2003 | Celii et al. | | 2006/0054496 A1 | 3/2006 | Zhang et al. |
| 2003/0146877 A1 | 8/2003 | Mueller | | 2006/0057283 A1 | 3/2006 | Zhang et al. |
| 2003/0152829 A1 | 8/2003 | Zhang et al. | | 2006/0057304 A1 | 3/2006 | Zhang et al. |
| 2003/0162094 A1 | 8/2003 | Lee et al. | | 2006/0063074 A1 | 3/2006 | Jenson et al. |
| 2003/0173207 A1 | 9/2003 | Zhang et al. | | 2006/0071592 A1 | 4/2006 | Narasimhan et al. |
| 2003/0173208 A1 | 9/2003 | Pan et al. | | 2006/0155545 A1 | 7/2006 | Janye |
| 2003/0174391 A1 | 9/2003 | Pan et al. | | 2006/0201583 A1 | 9/2006 | Michaluk et al. |
| 2003/0175142 A1 | 9/2003 | Milonopoulou et al. | | 2006/0210779 A1 | 9/2006 | Weir et al. |
| 2003/0178623 A1 | 9/2003 | Nishiki et al. | | 2006/0222954 A1 | 10/2006 | Skotheim et al. |
| 2003/0178637 A1 | 9/2003 | Chen et al. | | 2006/0234130 A1 | 10/2006 | Inda |
| 2003/0180610 A1 | 9/2003 | Felde et al. | | 2006/0237543 A1 | 10/2006 | Goto et al. |
| 2003/0185266 A1 | 10/2003 | Henrichs | | 2006/0255435 A1 | 11/2006 | Fuergut et al. |
| 2003/0030589 A1 | 12/2003 | Zurcher et al. | | 2006/0286448 A1 | 12/2006 | Snyder et al. |
| 2003/0231106 A1 | 12/2003 | Shafer | | 2007/0009802 A1 | 1/2007 | Lee et al. |
| 2003/0232248 A1 | 12/2003 | Iwamoto et al. | | 2007/0021156 A1 | 1/2007 | Hoong et al. |
| 2004/0008587 A1 | 1/2004 | Siebott et al. | | 2007/0023275 A1 | 2/2007 | Tanase et al. |
| 2004/0015735 A1 | 1/2004 | Norman | | 2007/0037058 A1 | 2/2007 | Visco et al. |
| 2004/0023106 A1 | 2/2004 | Benson et al. | | 2007/0053139 A1 | 3/2007 | Zhang et al. |
| 2004/0028875 A1 | 2/2004 | Van Rijn et al. | | 2007/0087230 A1 | 4/2007 | Jenson et al. |
| 2004/0029311 A1 | 2/2004 | Snyder et al. | | 2007/0091543 A1 | 4/2007 | Gasse et al. |
| 2004/0038050 A1 | 2/2004 | Saijo et al. | | 2007/0125638 A1 | 6/2007 | Zhang et al. |
| 2004/0043557 A1 | 3/2004 | Haukka et al. | | 2007/0141468 A1 | 6/2007 | Barker |
| 2004/0048157 A1 | 3/2004 | Neudecker et al. | | 2007/0148065 A1 | 6/2007 | Weir et al. |
| 2004/0058237 A1 | 3/2004 | Higuchi et al. | | 2007/0148553 A1 | 6/2007 | Weppner |
| 2004/0072067 A1 | 4/2004 | Minami et al. | | 2007/0151661 A1 | 7/2007 | Mao et al. |
| 2004/0077161 A1 | 4/2004 | Chen et al. | | 2007/0164376 A1 | 7/2007 | Burrows et al. |
| 2004/0078662 A1 | 4/2004 | Hamel et al. | | 2007/0166612 A1 | 7/2007 | Krasnov et al. |
| 2004/0081415 A1 | 4/2004 | Demaray et al. | | 2007/0184345 A1 | 8/2007 | Neudecker et al. |
| 2004/0081860 A1 | 4/2004 | Hundt et al. | | 2007/0196682 A1 | 8/2007 | Visser et al. |
| 2004/0085002 A1 | 5/2004 | Pearce | | 2007/0205513 A1 | 9/2007 | Brunnbauer et al. |
| 2004/0101761 A1 | 5/2004 | Park et al. | | 2007/0210459 A1 | 9/2007 | Burrows et al. |
| 2004/0105644 A1 | 6/2004 | Dawes | | 2007/0222681 A1 | 9/2007 | Greene et al. |
| 2004/0106038 A1* | 6/2004 | Shimamura et al. .......... 429/152 | | 2007/0224951 A1 | 9/2007 | Gilb et al. |
| 2004/0106045 A1 | 6/2004 | Ugaji | | 2007/0229228 A1 | 10/2007 | Yamazaki et al. |
| 2004/0106046 A1 | 6/2004 | Inda | | 2007/0235320 A1 | 10/2007 | White et al. |
| 2004/0118700 A1 | 6/2004 | Schierle-Arndt et al. | | 2007/0264564 A1 | 11/2007 | Johnson et al. |
| 2004/0126305 A1 | 7/2004 | Chen et al. | | 2007/0278653 A1 | 12/2007 | Brunnbauer et al. |
| 2004/0151986 A1 | 8/2004 | Park et al. | | 2007/0298326 A1 | 12/2007 | Angell et al. |
| 2004/0161640 A1 | 8/2004 | Salot | | 2008/0003496 A1 | 1/2008 | Neudecker et al. |
| 2004/0175624 A1 | 9/2004 | Luski et al. | | 2008/0008936 A1 | 1/2008 | Mizuta et al. |
| 2004/0188239 A1 | 9/2004 | Robison et al. | | 2008/0014501 A1 | 1/2008 | Skotheim et al. |
| 2004/0209159 A1 | 10/2004 | Lee et al. | | 2008/0057397 A1 | 3/2008 | Skotheim et al. |
| 2004/0212276 A1 | 10/2004 | Brantner et al. | | 2008/0150829 A1 | 6/2008 | Lin et al. |
| 2004/0214079 A1 | 10/2004 | Simburger et al. | | 2008/0213672 A1 | 9/2008 | Skotheim et al. |
| 2004/0219434 A1 | 11/2004 | Benson et al. | | 2008/0233708 A1 | 9/2008 | Hisamatsu |
| 2004/0245561 A1 | 12/2004 | Sakashita et al. | | 2008/0254575 A1 | 10/2008 | Fuergut et al. |
| 2004/0258984 A1 | 12/2004 | Ariel et al. | | 2008/0261107 A1 | 10/2008 | Snyder et al. |
| 2004/0259305 A1 | 12/2004 | Demaray et al. | | 2008/0263855 A1 | 10/2008 | Li et al. |
| 2005/0000794 A1 | 1/2005 | Demaray et al. | | 2008/0286651 A1 | 11/2008 | Neudecker et al. |
| 2005/0006768 A1 | 1/2005 | Narasimhan et al. | | 2009/0092903 A1 | 4/2009 | Johnson et al. |
| 2005/0048802 A1 | 3/2005 | Zhang et al. | | 2009/0124201 A1 | 5/2009 | Meskens |
| 2005/0070097 A1 | 3/2005 | Barmak et al. | | 2009/0181303 A1 | 7/2009 | Neudecker et al. |
| 2005/0072458 A1 | 4/2005 | Goldstein | | 2009/0302226 A1 | 12/2009 | Schieber et al. |
| 2005/0079418 A1 | 4/2005 | Kelley et al. | | 2009/0308936 A1 | 12/2009 | Nitzan et al. |
| 2005/0095506 A1 | 5/2005 | Klaassen | | 2009/0312069 A1 | 12/2009 | Peng et al. |
| 2005/0105231 A1 | 5/2005 | Hamel et al. | | 2010/0001079 A1 | 1/2010 | Martin et al. |
| 2005/0110457 A1 | 5/2005 | LaFollette et al. | | 2010/0032001 A1 | 2/2010 | Brantner |
| 2005/0112461 A1 | 5/2005 | Amine et al. | | 2010/0086853 A1 | 4/2010 | Venkatachalam et al. |
| 2005/0118464 A1 | 6/2005 | Levanon | | 2011/0267235 A1 | 11/2011 | Brommer et al. |
| 2005/0130032 A1 | 6/2005 | Krasnov et al. | | 2011/0304430 A1 | 12/2011 | Brommer et al. |
| 2005/0133361 A1 | 6/2005 | Ding et al. | | | | |
| 2005/0141170 A1 | 6/2005 | Honda et al. | | | | |

FOREIGN PATENT DOCUMENTS

| | | |
|---|---|---|
| CN | 1532984 | 9/2004 |
| DE | 19824145 | 12/1999 |
| DE | 10 2005 014 427 A1 | 9/2006 |
| DE | 10 2006 054 309 A1 | 11/2006 |
| DE | 10 2008 016 665 A1 | 10/2008 |
| DE | 102007030604 | 1/2009 |
| EP | 0 510 883 | 10/1992 |
| EP | 0 639 655 | 2/1995 |

| | | | |
|---|---|---|---|
| 2005/0142447 A1 | 6/2005 | Nakai et al. | |
| 2005/0147877 A1 | 7/2005 | Tarnowski et al. | |
| 2005/0158622 A1 | 7/2005 | Mizuta et al. | |
| 2005/0175891 A1 | 8/2005 | Kameyama et al. | |
| 2005/0176181 A1 | 8/2005 | Burrows et al. | |
| 2005/0181280 A1 | 8/2005 | Ceder et al. | |
| 2005/0183946 A1 | 8/2005 | Pan et al. | |
| 2005/0189139 A1 | 9/2005 | Stole | |

| | | |
|---|---|---|
| EP | 0 652 308 | 5/1995 |
| EP | 0 820 088 | 1/1998 |
| EP | 1 068 899 | 1/2001 |
| EP | 0 867 985 | 2/2001 |
| EP | 1 092 689 | 4/2001 |
| EP | 1 189 080 | 3/2002 |
| EP | 1 713 024 A1 | 10/2006 |
| FR | 2806198 | 9/2001 |
| FR | 2 861 218 | 4/2005 |
| JP | 55009305 | 1/1980 |
| JP | 56-076060 | 6/1981 |
| JP | 56156675 | 12/1981 |
| JP | 60-068558 | 4/1985 |
| JP | 60068558 | 4/1985 |
| JP | 61-269072 | 11/1986 |
| JP | 62267944 | 11/1987 |
| JP | 63-290922 | 11/1988 |
| JP | 2000-162234 | 11/1988 |
| JP | 2-054764 | 2/1990 |
| JP | 2230662 | 9/1990 |
| JP | 03-036962 | 2/1991 |
| JP | 4058456 | 2/1992 |
| JP | 4072049 | 3/1992 |
| JP | 6-010127 | 1/1994 |
| JP | 6-100333 | 4/1994 |
| JP | 7-233469 | 5/1995 |
| JP | 7-224379 | 8/1995 |
| JP | 08-114408 | 5/1996 |
| JP | 10-026571 | 1/1998 |
| JP | 11204088 | 7/1999 |
| JP | 2000144435 | 5/2000 |
| JP | 2000188099 | 7/2000 |
| JP | 2000268867 | 9/2000 |
| JP | 2001-171812 | 6/2001 |
| JP | 2001259494 | 9/2001 |
| JP | 2001297764 | 10/2001 |
| JP | 2001328198 | 11/2001 |
| JP | 2002-140776 | 5/2002 |
| JP | 2002-344115 | 11/2002 |
| JP | 2003-17040 | 1/2003 |
| JP | 2003347045 | 12/2003 |
| JP | 2004071305 | 3/2004 |
| JP | 2004149849 | 5/2004 |
| JP | 2004-158268 | 6/2004 |
| JP | 2004273436 | 9/2004 |
| JP | 2005-256101 | 9/2005 |
| JP | 2002-026412 | 2/2007 |
| JP | 7-107752 | 4/2007 |
| KR | 20020007881 | 1/2002 |
| KR | 20020017790 | 3/2002 |
| KR | 20020029813 | 4/2002 |
| KR | 20020038917 | 5/2002 |
| KR | 20030033913 | 5/2003 |
| KR | 20030042288 | 5/2003 |
| KR | 20030085252 | 11/2003 |
| RU | 2241281 | 11/2004 |
| SP | 10-239187 | 9/1998 |
| WO | WO 9513629 | 5/1995 |
| WO | WO 9623085 | 8/1996 |
| WO | WO 9623217 | 8/1996 |
| WO | WO 9727344 | 7/1997 |
| WO | WO 9735044 | 9/1997 |
| WO | WO 9847196 | 10/1998 |
| WO | WO 9943034 | 8/1999 |
| WO | WO 9957770 | 11/1999 |
| WO | WO 0021898 | 4/2000 |
| WO | WO 0022742 | 4/2000 |
| WO | WO 0028607 | 5/2000 |
| WO | WO 0036665 | 6/2000 |
| WO | WO 0060682 | 10/2000 |
| WO | WO 0060689 | 10/2000 |
| WO | WO 0062365 | 10/2000 |
| WO | WO 0101507 | 1/2001 |
| WO | WO 0117052 A2 | 3/2001 |
| WO | WO 0124303 | 4/2001 |
| WO | WO 0133651 A1 | 5/2001 |
| WO | WO 0139305 A1 | 5/2001 |
| WO | WO 0173864 A2 | 10/2001 |
| WO | WO 0173865 A2 | 10/2001 |
| WO | WO 0173866 A2 | 10/2001 |
| WO | WO 0173868 A2 | 10/2001 |
| WO | WO 0173870 A2 | 10/2001 |
| WO | WO 0173883 A2 | 10/2001 |
| WO | WO 0173957 A2 | 10/2001 |
| WO | WO 0182390 | 11/2001 |
| WO | WO 0212932 | 2/2002 |
| WO | WO 0242516 | 5/2002 |
| WO | WO 0247187 A1 | 6/2002 |
| WO | WO 02071506 | 9/2002 |
| WO | WO 02101857 | 12/2002 |
| WO | WO 03005477 | 1/2003 |
| WO | WO 03026039 | 3/2003 |
| WO | WO 03036670 | 5/2003 |
| WO | WO 03/003485 * | 6/2003 |
| WO | WO 03069714 | 8/2003 |
| WO | WO 03080325 | 10/2003 |
| WO | WO 03083166 | 10/2003 |
| WO | WO 2004012283 | 2/2004 |
| WO | WO 2004021532 | 3/2004 |
| WO | WO 2004061887 | 7/2004 |
| WO | WO 2004077519 | 9/2004 |
| WO | WO 2004086550 | 10/2004 |
| WO | WO 2004106581 | 12/2004 |
| WO | WO 2004106582 | 12/2004 |
| WO | WO 2005008828 | 1/2005 |
| WO | WO 2005013394 | 2/2005 |
| WO | WO 2005038957 | 4/2005 |
| WO | WO 2005067645 | 7/2005 |
| WO | WO 2005085138 | 9/2005 |
| WO | WO 2005091405 | 9/2005 |
| WO | WO 2006063308 | 6/2006 |
| WO | WO 2006085307 | 8/2006 |
| WO | WO 2007016781 | 2/2007 |
| WO | WO 2007019855 | 2/2007 |
| WO | WO 2007027535 | 3/2007 |
| WO | WO 2007095604 A2 | 8/2007 |
| WO | WO 2008036731 A2 | 3/2008 |

OTHER PUBLICATIONS

Affinito, J.D. et al., "Polymer-oxide transparent barrier layers," Society of Vacuum Coaters, 39$^{th}$ Ann. Technical Conference Proceedings, May 5-10, 1996, Philadelphia, PA, pp. 392-397 (1996).

Alder, T. et al., "High-efficiency fiber-to-chip coupling using low-loss tapered single-mode fiber," IEEE Photonics Tech. Lett. 12(8): 1016-1018 (2000).

Almeida, V.R. et al., "Nanotaper for compact mode conversion," Optics Letters 28(15): 1302-1304 (2003).

Anh et al., "Significant Suppression of Leakage Current in $(Ba,Sr)TiO_3$ Thin Films by Ni or Mn Doping," J. Appl. Phys.,92(5): 2651-2654 (Sep. 2002).

Asghari, M. and Dawnay, E., "ASOC™—a manufacturing integrated optics technology," SPIE 3620: 252-262 (Jan. 1999).

Barbier, D. et al., "Amplifying four-wavelength combiner, based on erbium/ytterbium-doped waveguide amplifiers and integrated splitters," IEEE Photonics Tech. Lett. 9:315-317 (1997).

Barbier, D., "Performances and potential applications of erbium doped planar waveguide amplifiers and lasers," Proc. OAA, Victoria, BC, Canada, pp. 58-63 (Jul. 21-23, 1997).

Beach R.J., "Theory and optimization of lens ducts," Applied Optics 35(12): 2005-2015 (1996).

Belkind, A. et al., "Pulsed-DC Reactive Sputtering of Dielectrics: Pulsing Parameter Effects," 43$^{rd}$ Annual Technical Conference Proceedings (2000).

Belkind, A. et al., "Using pulsed direct current power for reactive sputtering of $Al_2O_3$," J. Vac. Sci. Technol. A 17(4): 1934-1940 (1999).

Bestwick, T., "ASOC™ silicon integrated optics technology," SPIE 3631: 182-190 (1999).

Borsella, E. et al., "Structural incorporation of silver in soda-lime glass by the ion-exchange process: a photoluminescence spectroscopy study," Applied Physics A 71: 125-132 (2000).

Byer, R.L., "Nonlinear optics and solid-state lasers: 2000," IEEE J. Selected Topics in Quantum Electronics 6(6): 911-930 (2000).

Campbell, S.A. et al., "Titanium dioxide (TiO2)-based gate insulators," IBM J. Res. Develop. 43(3): 383-392 (1999).

Chang, C.Y. and Sze, S.M. (eds.), in ULSI Technology, The McGraw-Hill Companies, Inc., Nyew York, Chapter 4, pp. 169-170 and 226-231 (1996).

Chen, G. et al., "Development of supported bifunctional electrocatalysts for unitized regenerative fuel cells," J. Electrochemical Society 149(8): A1092-A1099 (2002).

Choi, Y.B. et al., "Er-Al-codoped silicate planar light waveguide-type amplifier fabricated by radio-frequency sputtering," Optics Letters 25(4): 263-265 (2000).

Choy et al., "Eu-Doped Y2O3 Phosphor Films Produced by Electrostatic-Assisted Chemical Vapor Deposition," J. Mater. Res. 14(7): 3111-3114 (Jul. 1999).

Cocorullo, G. et al., "Amorphous silicon waveguides and light modulators for integrated photonics realized by low-temperature plasma-enhanced chemical-vapor deposition," Optics Lett. 21(24): 2002-2004 (1996).

Cooksey, K. et al., "Predicting permeability & Transmission rate for multilayer materials," Food Technology 53(9): 60-63 (1999).

Crowder, M.A. et al., "Low-temperature single-crystal Si TFT's fabricated on Si films processed via sequential lateral solidification," IEEE Electron Device Lett. 19(8): 306-308 (1998).

Delavaux, J-M. et al., "Integrated optics erbium ytterbium amplifier system in 10Gb/s fiber transmission experiment," $22^{nd}$ European Conference on Optical Communication, Osla, I.123-I.126 (1996).

Distributed Energy Resources: Fuel Cells, Projects, 4 pages http://www.eere.energy.gov/der/fuel_cells/projects.html (2003).

Dorey, R.A., "Low temperature micromoulding of functional ceramic devices," Grant summary for GR/S84156/01 for the UK Engineering and Physical Sciences Research Council, 2 pages (2004).

DuPont Teijin Films, Mylar 200 SBL 300, Product Information, 4 pages (2000).

Electrometals Technologies Limited, Financial Report for 2002, Corporate Directory, Chairman's review, Review of Operations, 10 pages (2002).

E-Tek website: FAQ, Inside E-Tek, E-TEk News, Products; http://www.etek-inc.com/, 10 pages (2003).

Flytzanis, C. et al., "Nonlinear optics in composite materials," in Progress in Optics XXIX, Elsevier Science Publishers B.V., pp. 323-425 (1991).

Frazao, O. et al., "EDFA gain flattening using long-period fibre gratings based on the electric arc technique," Proc. London Comm. Symp. 2001, London, England, 3 pages (2001).

Lee, B.H. et al., "Effects of interfacial layer growth on the electrical characteristics of thin titanium oxide films on silion," Appl. Phys. Lett. 74(21):3143-3145 (1999).

Lee, K.K. et al., "Effect of size and roughness on light transmission in a $Si/SiO_2$ waveguide: Experiments and model," Appl. Phys. Lett. 77(11):1617-1619 (2000).

Love, J.D. et al., "Quantifying Loss Minimisation in Single-Mode Fibre Tapers," Electronics Letters 22(17):912-914 (1986).

Mardare, D. and Rusu, G.I., "On the structure of Titanium Oxide Thin Films," Andalele Stiintifice Ale Universitatii IASI, Romania, pp. 201-208 (1999).

Marques, P.V.S. et al., "Planar Silica-on-Silicon Waveguide Lasers Based in Two Layers Core Devices," $10^{th}$ European Conference on Integrated Optics, Session WeB2, pp. 79-82 (2001).

Meijerink, A. et al, "Luminescence of $Ag^+$ in Crystalline and Glassy $Srb_4O_7$," J. Physics Chem. Solids 54(8):901-906 (1993).

Mesnaoui, M. et al, "Spectroscopic properties of $Ag^+$ ions in phosphate glasses of $NaPO_3$- $AgPO_3$ system," Eur. J. Solid State Inorg. Chem. 29:1001-1013 (1992).

Mitomi, O. et al., "Design of a Single-Mode Tapered Waveguide for Low-Loss Chip-to-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Ohkubo, H. et al., Polarization-Insensitive Arrayed-Waveguide Grating Using Pure $SiO_2$ Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 Page (2004).

Ohtsuki, T., et al., "Gain Characteristics of high concentration $Er^{3+}$-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC 2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., "Planar $Er^{3+}$-doped aluminosilicate waveguide amplifier with more than 10 dB gain across C-band," Optical Society of America, 3 pages (2000).

Park et al., "Characteristics of Pt Thin Film on the Conducting Ceramics TiO and Ebonex ($Ti_4O_7$) as Electrode Materials," Thin Solid Films 258: 5-9 (1995).

Peters, D.P. et al., "Formation mechanism of silver nanocrystals made by ion irradiation of $Na^+$—$Ag^+$ ion-exchanged sodalime silicate glass," Nuclear Instruments and Methods in Physics Research B 168:237-244 (2000).

Rajarajan, M. et al., "Numerical Study of Spot-Size Expanders fro an Efficient OEIC to SMF Coupling," IEEE Photonics Technology Letters 10(8): 1082-1084 (1998).

Ramaswamy, R.V. et al., "Ion-Exchange Glass Waveguides: A Review," J. Lightwave Technology 6(6): 984-1002 (1988).

Roberts, S.W. et al., "The Photoluminescence of Erbium-doped Silicon Monoxide," University of Southampton, Department of Electronics and Computer Science Research Journal, 7 pages (1996).

Saha et al., "Large Reduction of Leakage Current by Graded-Layer La Doping in $(Ba0.5,Sr0.5)TiO3$ Thin Films," Appl. Phys. Lett. 79(1): 111-113 (Jul. 2001).

Sanyo Vacuum Industries Co., Ltd. Products Infor, $TiO_2$, (2003), 1 page, http://www.sanyovac.co.jp/Englishweb/products?EtiO2.htm.

Schermer, R. et al., "Investigation of Mesa Dielectric Waveguides," Proceedings of the OSA Integrated Photonics Research Topical Meeting and Exhibit, Paper No. IWB3, 3 pages (2001).

Schiller, S. et al., "PVD Coating of Plastic Webs and Sheets with High Rates on Large Areas," European Materials Research Society 1999 Spring Meeting, Jun. 1-4, 1999, Strasbourg, France, 13 pages (1999).

Scholl, R., "Power Supplies for Pulsed Plasma Technologies: State-of-the-Art and Outlook," Advances Energy Industries, Inc. 1-8 (1999).

Scholl, R., "Power Systems for Reactive Sputtering of Insulating Films," Advances Energy Industries, Inc., 1-8 (Aug. 2001).

Second International Symposium of Polymer Surface Modification: Relevance to Adhesion, Preliminary Program, 13 pages (1999).

Seventh International Conference on $TiO_2$ Photocatalysis: Fundamentals & Applications, Toronto, Ontario, Canada, Final Program, 7 pages (Nov. 17-21, 2002).

Sewell, P. et al., "Rib Waveguide Spot-Size Transformers: Modal Properties," J Lightwave Technology 17(5):848-856 (1999).

Shaw, D.G. et al., "Use of Vapor Deposited Acrylate Coatings to Improve the Barrier Properties of Metallized Film," Society of Vacuum Coaters, $37^{th}$ Annual Technical Conference Proceedings, pp. 240-244 (1994).

Shin, J.C. et al. "Dielectric and Electrical Properties of Sputter Grown $(Ba,Se)TiO_3$ Thin Films," J. Appl. Phys. 86(1):506-513 (1999).

Shmulovich, J. et al., "Recent progress in Erbium-doped waveguide amplifiers," Bell Laboratories, pp. 35-37 (1999).

Slooff, L.H. et al., "Optical properties of Erbium-doped organic polydentate cage complexes," J. Appl. Phys. 83(1):497-503 (1998).

Smith, R.E. et al., "Reduced Coupling Loss Using a Tapered-Rib Adiabatic-Following Fiber Coupler," IEEE Photonics Technology Lett. 8(8):1052-1054 (1996).

Snoeks, E. et al., "Cooperative upconversion in erbium-implanted soda-lime silicate glass optical waveguides," J. Opt. Soc. Am. B 12(8): 1468-1474 (1995).

Strohhofer, C. and Polman, A. "Energy transfer to $Er^{3+}$ in Ag ion-exchanged glass," FOM Institute for Atomic and Molecular Physics, 10 pages (2001).
Sugiyama, A. et al., "Gas Permeation Through the Pinholes of Plastic Film Laminated with Aluminum Foil," Vuoto XXVIII(1-2):51-54 (1999).
Tervonen, A. "Challenges and opportunities for integrated optics in optical networks," SPIE 3620:2-11 (1999).
Ting, C.Y. et al., "Study of planarized sputter-deposited $SiO_2$," J. Vac. Sci Technol, 15(3):1105-1112 (1978).
Tomaszewski, H. et al., "Yttria-stabilized zirconia thin films grown by reactive r.f. magnetron sputtering," Thin Solid Films 287: 104-109 (1996).
Fujii, M. et al., "1.54 µm photoluminescence of $Er^{3+}$ doped into $SiO_2$ films containing Si nanocrystals: evidence for energy transfer from Si nanocrystals for $Er^{3+}$," Appl. Phys. Lett. 71(9): 1198-1200 (1997).
Garcia, C. et al., "Size dependence of lifetime and absorption cross section of Si nanocrystals embedded in $SiO_2$," Appl. Phys. Lett. 82(10): 1595-1597 (2003).
Goossens, A. et al., "Sensitization of $TiO_2$ with p-type semiconductor polymers," Chem. Phys. Lett. 287: 148 (1998).
Greene, J.E. et al., "Morphological and electrical properties of rf sputtered $Y_2O_3$-doped $ZrO_2$ thin films," J. Vac. Sci. Tech. 13(1): 72-75 (1976).
Han, H.-S. et al., "Optical gain at 1.54 µm in Erbium-doped Silicon nanocluster sensitized waveguide," Appl. Phys. Lett. 79(27): 4568-4570 (2001).
Hayakawa, T. et al., "Enhanced fluorescence from $Eu^{3+}$ owing to surface plasma oscillation of silver particles in glass," J. Non-Crystalline Solids 259: 16-22 (1999).
Hayakawa, T. et al., "Field enhancement effect of small Ag particles on the fluorescence from $Eu^{3+}$-doped $SiO_2$ glass," Appl. Phys. Lett. 74(11): 1513-1515 (1999).
Hayfield, P.C.S., I Development of a New Material-Monolithic $Ti_4O_7$ Ebonix® Ceramic, Royal Society of Chemistry, Cambridge, Table of Contents, 4 pages (2002).
Hehlen, M.P. et al., "Spectroscopic properties of $Er^{3+}$- and $Yb^{3+}$- doped soda-lime silicate and aluminosilicate glasses," Physical Review B 56(15): 9302-9318 (1997).
Hehlen, M.P. et al., "Uniform upconversion in high-concentration $Er^{3+}$-doped soda lime silicate and aluminosilicate glasses," Optics Letters 22(11); 772-774 (1997).
Horst, F. et al., "Compact, tunable optical devices in silicon-oxynitride waveguide technology," Top. Meeting Integrated Photonics Res. '00, Quebec, Canada, p. IThF1, 3 pages (2000).
Howson, R.P., "The reactive sputtering of oxides and nitrides," Pure & Appl. Chem. 66(6): 1311-1318 (1994).
Hubner, J. and Guldberg-Kjaer, S., "Planar Er- and Yb-doped amplifiers and lasers," COM Technical University of Denmark, $10^{th}$ European Conf. on Integrated Optics, Session WeB2, pp. 71-74 (2001).
Hwang et al., "Characterization of sputter-deposited $LiMn_2O_4$ thin films for rechargeable microbatteries," 141(12) J. Electrochem. Soc. 3296-99 (1994).
Hwang, M-S. et al., "The effect of pulsed magnetron sputtering on the properties of iridium tin oxide thin films," Surface and Coatings Tech. 171: 29-33 (2003).
Im, J.S. and Sposili, R.S., "Crystalline Si films for integrated active-matrix liquid crystal displays," MRS aBulletin, pp. 39-48 (1996).
Im, J.S. et al., "Controlled super-lateral growth of Si-films for microstructural manipulation and optimization," Physica Status Solidi (A) 166(2): 603-617 (1998).
Im, J.S. et al., "Single-crystal Si films for thin-film transistor devices," Appl. Physics Lett. 70(25): 3434-3436 (1997).
Itoh, M. et al., "Large reduction of singlemode-fibre coupling loss in 1.5% Δ planar lightwave circuits using spot-size converters," Electronics Letters 38(2): 72-74 (2002).
Jackson, M.K. and Movassaghi, M., "An accurate compact EFA model," Eur. Conf. Optical Comm., Munich, Germany, 2 pages (2000).
Janssen, R. et al., "Photoinduced electron transfer from conjugated polymers onto nanocrystalline $TiO_2$," Synthet. Metal., 1 page (1999).

Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).
Jonsson, L.B. et al., "Frequency response in pulsed DC reactive sputtering processes," Thin Solid Films 365: 43-48 (2000).
Kato, K. and Inoue, Y., "Recent progress on PLC hybrid integration," SPIE 3631: 28-36 (1999).
Kato, K. and Tohmori, Y., "PLC hybrid integration technology and its application to photonic components," IEEE J. Selected Topics in Quantum Electronics 6(1): 4-13 (2000).
Kelly, P.J. and Arnell, R.D., "Control of the structure and properties of aluminum oxide coatings deposited by pulsed magnetron sputtering," J. Vac. Sci. Technol. A 17(3): 945-953 (1999).
Kelly, P.J. et al., "A novel technique for the deposition of aluminum-doped zinc oxide films," Thin Solid Films 426(1-2): 111-116 (2003).
Kelly, P.J. et al., "Reactive pulsed magnetron sputtering process for alumina films," J. Vac. Sci. Technol. A 18(6): 2890-2896 (2000).
Kik, P.G. and Polman, A., "Gain limiting processes in Er-doped Si nanocrystal waveguides in $SiO_2$," J. Appl. Phys. 91(1): 536-536 (2002).
Kim et al., "Correlation Between the Microstructures and the Cycling Performance of $RuO_2$ Electrodes for Thin-Film Microsupercapacitros," J. Vac. Sci. Technol. B20(5): 1827-1832 (Sep. 2002).
Kim, D-W. et al. "Mixture Behavior and Microwave Dielectric Properties in the Low-fired $TiO_2$-CuO System," Jpn. J. Appl. Phys. 39:2696-2700 (2000).
Kim, H-K. et al., "Characteristics of rapid-thermal-annealed LiCoO2 cathode film for an all-solid-state thin film microbattery," J. Vac. Sci. Technol. A 22(4): 1182-1187 (2004).
Kim, J-Y. et al. "Frequency-dependent pulsed direct current magnetron sputtering of titanium oxide films," J. Vac. Sci. Technol. A 19(2):429-434 (2001).
Ladouceur, F. and Love, J.D., in: Silica-based Buried Channel Waveguides and Devices, Chapman & Hall, London, Table of Contents, 6 pages (1996).
Ladouceur, F. et al., "Effect of side wall roughness in buried channel waveguides," IEEE Proc. Optoelectron. 141(4):242-248 (1994).
Lamb, W. and Zeiler, R., Designing Non-Foil Containing Skins for Vacuum Insulation Panel (VIP) Application, Vuoto XXVIII(1-2):55-58 (1999).
Lamb, W.B., "Designing Nonfoil Containing Skins for VIP Applications," DuPont VIA Symposium Presentation, 35 Pages (1999).
Lange, M.R. et al, "High Gain Ultra-Short Length Phosphate glass Erbium-Doped Fiber Amplifier Material," OSA Optical Fiber Communications (OFC), 3 Pages (2002).
Laporta, P. et al, "Diode-pumped cw bulk Er: Yb: glass laser," Optics Letters 16(24):1952-1954 (1991).
Laurent-Lund, C. et al., "PECVD Grown Multiple Core Planar Waveguides with Extremely Low Interface Reflections and Losses," IEEE Photonics Tech. Lett. 10(10):1431-1433 (1998).
Triechel, O. and Kirchhoff, V., "The influences of pulsed magnetron sputtering on topography and crystallinity of $TiO_2$ films on glass," Surface and Coating Technology 123:268-272 (2000).
Tukamoto, H. and West, A.R., "Electronic Conductivity of $LiCoO_x$ and Its Enhancement by Magnesium Doping," J. Electrochem. Soc 144(9):3164-3168 (1997).
Van Dover, R.B., "Amorphous Lanthanide-Doped $TiO_x$ Dielectric Films," Appl. Phys. Lett. 74(20):3041-3043 (1999).
Viljanen, J. and Leppihalme, M., "Planner Optical Coupling Elements for Multimode Fibers with Two-Step Ion Migration Process," Applied Physics 24(1):61-63 (1981).
Villegas, M.A. et al., "Optical spectroscopy of a soda lime glass exchanged with silver," Phys. Chem. Glasses 37(6):248-253 (1996).
Von Rottkay, K. et al., "Influences of stoichiometry on electrochromic cerium-titanium oxide compounds," Presented at the $11^{th}$ Int'l Conference of Solid State Ionics, Honolulu, Hawaii, Nov. 19, 1997, Published in Solid State Ionics 113-115:425-430. (1998).
Westlinder, J. et al., "Simulations and Dielectric Characterization of Reactive dc Magnetron Cosputtered $(Ta_2O_5)_{1-x}(TiO_2)_x$ Thin Films," J Vac. Sci. Technol. B 20(3):855-861 (May/Jun. 2002).

Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).

Yanagawa, H. et al., "Index-and-Dimensional Taper and Its Application to Photonic Devices," J. Lightwave Technology 10(5):587-591 (1992).

Yoshikawa, K. et al., "Spray formed aluminum alloys for sputtering targets," Powder Metallurgy 43(3): 198-199 (2000).

Zhang, H. et al., "High Dielectric Strength, High k $TiO_2$ Films by Pulsed DC, Reactive Sputter Deposition," 5 pages (2001).

Abraham, K.M. et al., "Inorganic-organic composite solid polymer electrolytes," 147(4) J. Electrochem. Soc. 1251-56 (2000).

Abrahams, I., "$Li_6Zr_2O_7$, a new anion vacancy ccp based structure, determined by ab initio powder diffraction methods," 104 J. Solid State Chem. 397-403 (1993).

Amatucci, G. et al., "Lithium scandium phosphate-based electrolytes for solid state lithium rechargeable microbatteries," 60 Solid State Ionics 357-65 (1993).

Appetecchi, G.B. et al., "Composite polymer electrolytes with improved lithium metal electrode interfacial properties," 145(12) J. Electrochem. Soc. 4126-32 (1998).

Bates, J.B. et al., "Electrical properties of amorphous lithium electrolyte thin films," 53-56 Solid State Ionics 647-54 (1992).

Delmas, C. et al., "Des conducteurs ioniques pseudo-bidimensionnels $Li_8MO_6$ (M = Zr, Sn), $Li_7LO_6$ (L = Nb, Ta) et $Li_6In_2O_6$," 14 Mat. Res. Bull. 619-25 (1979).

Hu, Y-W. et al., "Ionic conductivity of lithium phosphate-doped lithium orthosilicate," 11 Mat. Res. Bull. 1227-30 (1976).

Neudecker, B. et al., "$Li_9SiAlO_8$: a lithium ion electrolyte for voltages above 5.4 V," 143(7) J. Electrochem. Soc. 2198-203 (1996).

Ohno, H. et al., "Electrical conductivity of a sintered pellet of octalithium zirconate," 132 J. Nucl. Mat. 222-30 (1985).

Scholder, V. et al., "Über Zirkonate, Hafnate und Thorate von Barium, Strontium, Lithium und Natrium," Zeitschrift für Anorganische und Allgemeine Chemie, Band 362, pp. 149-168 (1968).

Yu, X. et al., "A stable thin-film lithium electrolyte: lithium phosphorus oxynitride," 144(2) J. Electrochem. Soc. 524-532 (1997).

Bates et al., "Thin-Film Lithium Batteries," in New Trends in Electrochemical Technology: Energy Storage Systems for Electronics (T. Osaka & M. Datta eds. Gordon and Breach 2000).

Wang et al., "Characterization of Thin-Film Rechargeable Lithium Batteries with Lithium Cobalt Oxide Cathodes," 143 J. Electrochem. Soc. 3203-13 (1996).

Sarro, P., "Silicon Carbide as a New MEMS Technology," Sensors and Actuators 82, 210-218 (2000).

Hwang et al., "Characterization of Sputter-Deposited $LiMn_2O_4$ Thin Films for Rechargeable Microbatteries," 141(12) J. Electrochem. Soc. 3296-99 (1994).

Jones et al., 53-56 Solid State Ionics 628 (1992).

Mattox "Handbook of Physical Vapor Deposition (PVD) Processing, Society of Vacuum Coaters," Albuquerque, New Mexico 660f and 692ff, Noyes Publications (1998).

Inaguma, Yoshiyuki, "High Ionic Conductivity in Lithium Lanthanum Titanate," Solid State Communications, vol. 86, No. 10, pp. 689-693 (1993).

Guy, D., "Novel Architecture of Composite Electrode for Optimization of Lithium Battery Performance," Journal of Power Sources 157, pp. 438-442 (2006).

Wolfenstine, J., "Electrical Conductivity and Charge Compensation in Ta Doped $Li_4Ti_5O_{12}$," Journal of Power Sources 180, pp. 582-585 (2008).

Balanis, Constantine A., "Antenna Theory: Analysis and Design," 3rd Ed., pp. 811-820 (2005).

Hill, R. et al., "Large Area Deposition by Mid-Frequency AC Sputtering," Society of Vacuum Coaters, $41^{st}$ Annual Tech. Conference Proceedings, 197-202 (1998).

Macák, Karol et al, "Ionized Sputter Deposition Using an Extremely High Plasma Density Pulsed Magnetron Discharge,"J. Vac. Sci. Technol. A 18(4):1533-37 (2000).

Balanis, Constantine A., "Antenna Theory: Analysis and Design," 3rd Ed., pp. 817-820 (John Wiley & Sons, Inc. Publication, 2005).

Jones and Akridge, "A thin film solid state microbattery," Solid State Ionics 53-56 (1992), pp. 628-634.

Amendment/Response to Non-Final Office Action dated Aug. 12, 2011, in U.S. Appl. No. 12/764,180.

Amendment/Response to Non-Final Office Action dated Aug. 26, 2011, in U.S. Appl. No. 12/111,388.

Final Office Action dated Nov. 8, 2011, in U.S. Appl. No. 12/764,180.

Final Office Action dated Nov. 9, 2011, in U.S. Appl. No. 12/111,388.

Applicant Initiated Interview Summary dated Dec. 6, 2011, in U.S. Appl. No. 12/764,180.

Amendment/Response to Final Office Action dated Jan. 6, 2012 in U.S. Appl. No. 12/111,388.

Amendment/Response to Final Office Action dated Jan. 6, 2012 in U.S. Application No. 12/764,180.

Advisory Action dated Jan. 19, 2012 in U.S. Appl. No. 12/111,388.

Advisory Action dated Jan. 19, 2012 in U.S. Appl. No. 12/764,180.

Amendment/Response to Final Office Action dated Feb. 7, 2012 in U.S. Appl. No. 12/111,388.

* cited by examiner

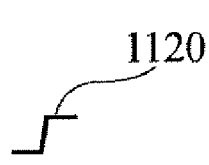
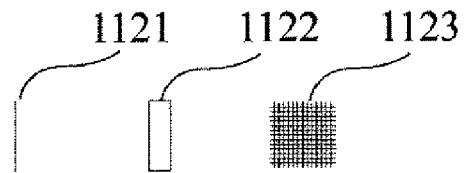
Figure 12A
Figure 12B
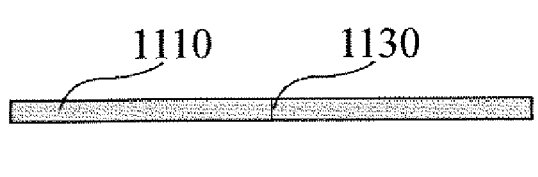
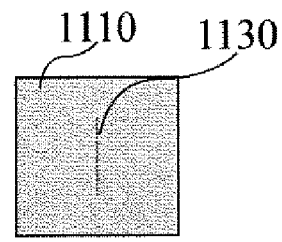
Figure 13A
Figure 13B
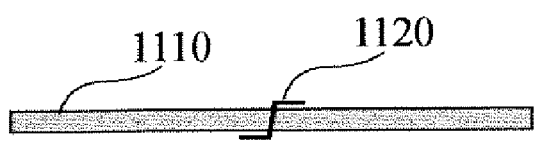
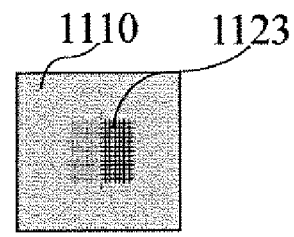
Figure 14A
Figure 14B
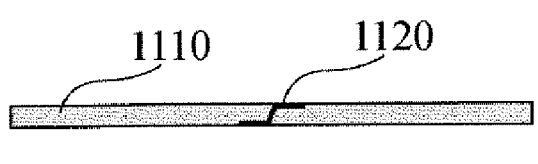
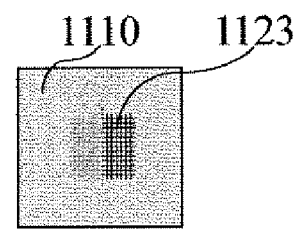
Figure 15A
Figure 15B

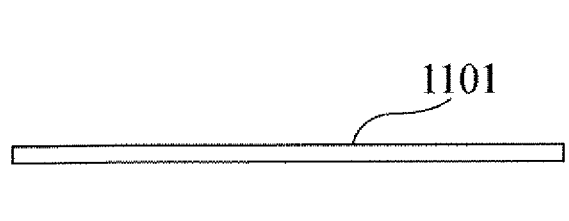 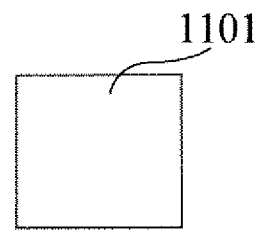
Figure 16A             Figure 16B
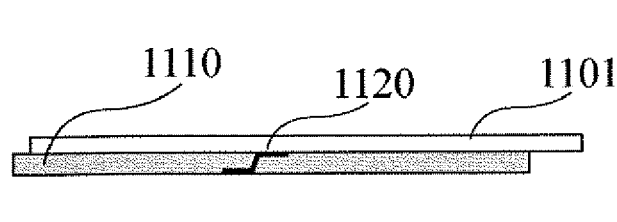 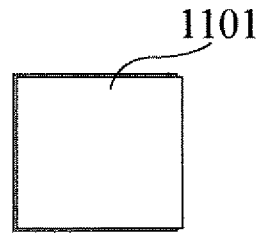
Figure 17A             Figure 17B
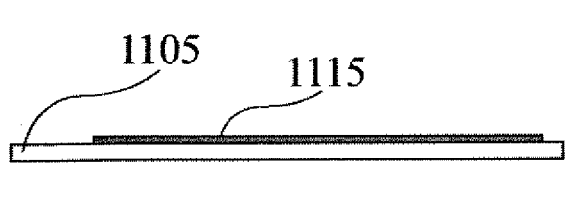 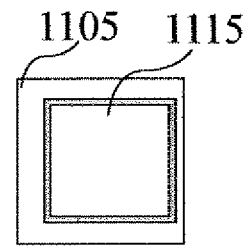
Figure 18A             Figure 18B
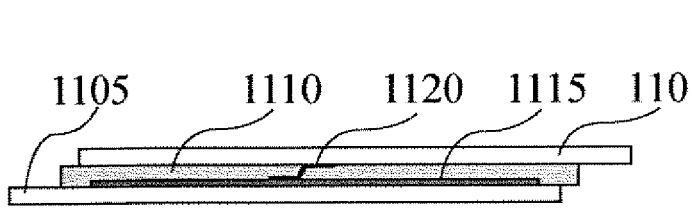 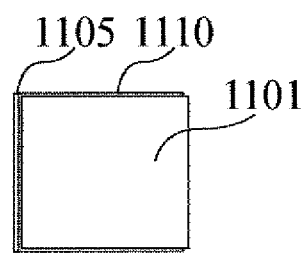
Figure 19A             Figure 19B

METAL FILM ENCAPSULATION

RELATED APPLICATIONS

The present application claims the benefit under 35 U.S.C. §119 of U.S. patent application Ser. No. 60/782,792, filed Mar. 16, 2006; and is a continuation-in-part, and claims the benefit under 35 U.S.C. §120, of U.S. patent application Ser. No. 11/561,277, filed Nov. 17, 2006, which claims the benefit under 35 U.S.C. §119 of U.S. patent application Ser. No. 60/737,613, filed Nov. 17, 2005, U.S. patent application Ser. No. 60/759,479 filed Jan. 17, 2006, and U.S. patent application Ser. No. 60/782,792, filed Mar. 16, 2006, and is a continuation-in-part, and claims the benefit under 35 U.S.C. §120, of U.S. patent application Ser. No. 11/209,536, filed Aug. 23, 2005; which is a continuation, and claims the benefit under 35 U.S.C. §120, of U.S. patent application Ser. No. 11/374,282, converted from U.S. Provisional Application Ser. No. 60/690,697, and filed Jun. 15, 2005; all of which are incorporated herein by reference in their entirety. The teachings of U.S. patent application Ser. No. 10/215,190, filed Aug. 9, 2002, now U.S. Pat. No. 6,916,679 is also incorporated herein by reference in its entirety.

FIELD OF THE INVENTION

The field of this invention is the device, composition, method of depositing, fabrication, and more specifically encapsulation of solid-state, thin-film, secondary and primary electrochemical devices, including batteries.

BACKGROUND

Typical electrochemical devices comprise multiple electrically active layers such as an anode, cathode, electrolyte, substrate, current collectors, etc. Some layers, such as, for example, an anode layer comprising Lithium, are comprised of materials that are very environmentally sensitive. Such batteries require an encapsulation to protect such environmentally sensitive material. Some schemes used to encapsulate the sensitive layers of electrochemical devices, such encapsulation with gold foil, are expensive. Other schemes encapsulate the device with pouch, for example, made of metal and plastic, that seals around the perimeter of the device. As the temperature changes the air within the metal and plastic pouch expands and/or contracts. This expansion and/or contraction may blow out the seals of the metal and plastic pouch or create other problems, thus eliminating the encapsulating benefits of the pouch.

Typical electrochemical devices also have tabs that extend out from the substrate. These tabs provide electrically conductive contact points for the battery. These tabs can be fragile and can break when gripped or secured from the outside and create difficulties when trying to design the encapsulation to maintain a proper seal around the tabs.

Thus, there is a need in the art to provide for better and cheaper encapsulating approaches and better approaches to providing electrically conductive contacts, including encapsulation that is substantially thinner than known encapsulation methods.

SUMMARY

One exemplary embodiment of the present invention includes a battery with a first electrical contact; a bonding layer coupled with the first electrical contact and having an embedded conductor; at least one cell structure; and a second electrical contact, wherein the bonding layer and the at least one cell structure are sandwiched between the first and second contact layers. The bonding layer may be selectively conductive through the embedded conductor. The cell structure may further be in selective electrical contact with the first electrical contact via the embedded conductor.

The first electrical contact may, for example, include an encapsulate metal. The second electrical contact may, for example include a substrate. The bonding layer may be an adhesive material, an insulating material, a plastic, glass, and/or fiberglass. The conductor may be a tab, a wire, multiple wires, a wire mesh, perforated metal, a metal coating applied to the adhesive layer, or a disk. The conductor may be woven within the bonding layer and the bonding layer may include a slit within which the embedded conductor is woven. The bonding layer may be an adhesive material containing one or more conductive portions that may be, for example, conductive powders, bodies or particles applied to one or more selected areas. The first and second contacts may be made from a conductive material such as, for example, gold, platinum, stainless steel, titanium, zirconium, cobalt, aluminum, indium, nickel, copper, silver, carbon, bronze, brass, beryllium, and/or oxides, nitrides, and alloys thereof. An insulating layer on the first and/or second contact may also be included. The insulating layer may be, for example, a plastic. The cell structure may include an anode, an electrolyte; a cathode, and a barrier layer. The cathode may, for example, not be annealed or annealed using rapid thermal anneal methods.

Another exemplary embodiment of the present invention includes method of manufacturing a thin film battery having, in no particular order, the steps of creating a selectively conductive bonding layer; coupling the bonding layer with a first contact layer; coupling a first side of a cell structure with a second contact layer; and coupling a second side of the cell structure with the bonding layer. Alternate steps may include creating a cell structure with an anode, cathode, and electrolyte layers; embedding a conductor within the bonding layer; weaving at least one conductive wire through the bonding layer wherein selective portions of the conductive wire are exposed; heating the bonding layer and compressing the conductor within the bonding layer; and insulating the battery with an insulating material. A reinforcement layer including KEVLAR®, fiberglass, plastic, glass or other insulating material may also be embedded within the bonding layer. This reinforcement layer is selectively conductive.

Another exemplary embodiment of the present invention is a device having an electrochemical device with at least one notch; and a metal foil. The metal foil may encapsulate the electrochemical device and a portion of the metal foil extends over the notch providing an electrical contact tab on the metal foil over the notched portion of the electrochemical device. The contact area may also have a hole. The metal foil may have one or more openings. The device may also have a second electrochemical device with a metal foil encapsulating both electrochemical devices. Furthermore, there may be a number of electrochemical devices with metal foils there between. The metal foil encapsulates or lies over the electrochemical device.

The metal foil may further include a cathode element of the electrochemical device. The electrochemical device may have a substrate and the metal foil may also be conductively attached to the substrate.

In any of these exemplary embodiments the metal foil, for example, may be made of stainless steel or any other metallic substance having the necessary characteristics and properties such as a requisite amount of conductivity. The device may, for example, also include an insulating layer. Furthermore, the metal foil may, for example, be less than 100 microns thick, less than 50 microns thick, or less than 25 microns thick.

Another exemplary embodiment of the present invention includes a method of manufacturing an electrochemical device comprising the steps of providing an electrochemical device the may include the steps of providing a substrate; and providing a notch in the electrochemical device. This exemplary embodiment may also, for example, include the step of encapsulating the substrate with a metal foil. In this embodiment, for example, the metal foil extends over the area notched in the step providing a notch and is conductively bonded to the substrate. This embodiment may also further include the step of fabricating a cathode on the substrate by rapid thermal anneal. Also, this exemplary embodiment may include the steps of providing a cathode, anode, electrolyte, current collector, barrier layer, an insulating material on the metal foil, and/or a second electrochemical device wherein the second electrochemical device is encapsulated by the metal foil. This exemplary embodiment may also include the step of providing openings in the metal foil. These openings may be prefabricated in the metal foil.

BRIEF DESCRIPTION OF THE FIGURES

FIG. 12A shows a side view of a stand alone conductor according to an exemplary embodiment of the present invention.

FIG. 12B shows top views of stand alone conductors according to an exemplary embodiment of the present invention.

FIG. 13A shows a side view of a bonding layer with a slit cut therein according to an exemplary embodiment of the present invention.

FIG. 13B shows a top view of a bonding layer with a slit cut therein according to an exemplary embodiment of the present invention.

FIG. 14A shows a side view of a conductor woven through a bonding layer according to an exemplary embodiment of the present invention.

FIG. 14B shows a top view of a mesh wire conductor woven through a bonding layer according to an exemplary embodiment of the present invention.

FIG. 15A shows a side view of a conductor embedded within a bonding layer according to an exemplary embodiment of the present invention.

FIG. 15B shows a top view of a mesh wire conductor embedded within a bonding layer according to an exemplary embodiment of the present invention.

FIG. 16A shows a side view of a first contact layer according to an exemplary embodiment of the present invention.

FIG. 16B shows a top view of a first contact layer according to an exemplary embodiment of the present invention.

FIG. 17A shows a side view of a first contact layer bonded with the bonding layer according to an exemplary embodiment of the present invention.

FIG. 17B shows a top view of a first contact layer bonded with the bonding layer according to an exemplary embodiment of the present invention.

FIG. 18A shows a side view of a cell structure on a second contact layer according to an exemplary embodiment of the present invention.

FIG. 18B shows a top view of a cell structure on a second contact layer according to an exemplary embodiment of the present invention.

FIG. 19A shows a side view of the first contact and bonding layer of FIG. 17A coupled with the cell structure and second contact of FIG. 18A according to an exemplary embodiment of the present invention.

FIG. 19B shows a top view of the first contact and bonding layer of FIG. 17B coupled with the cell structure and second contact of FIG. 18B according to an exemplary embodiment of the present invention.

DETAILED DESCRIPTION

Figure 1A:
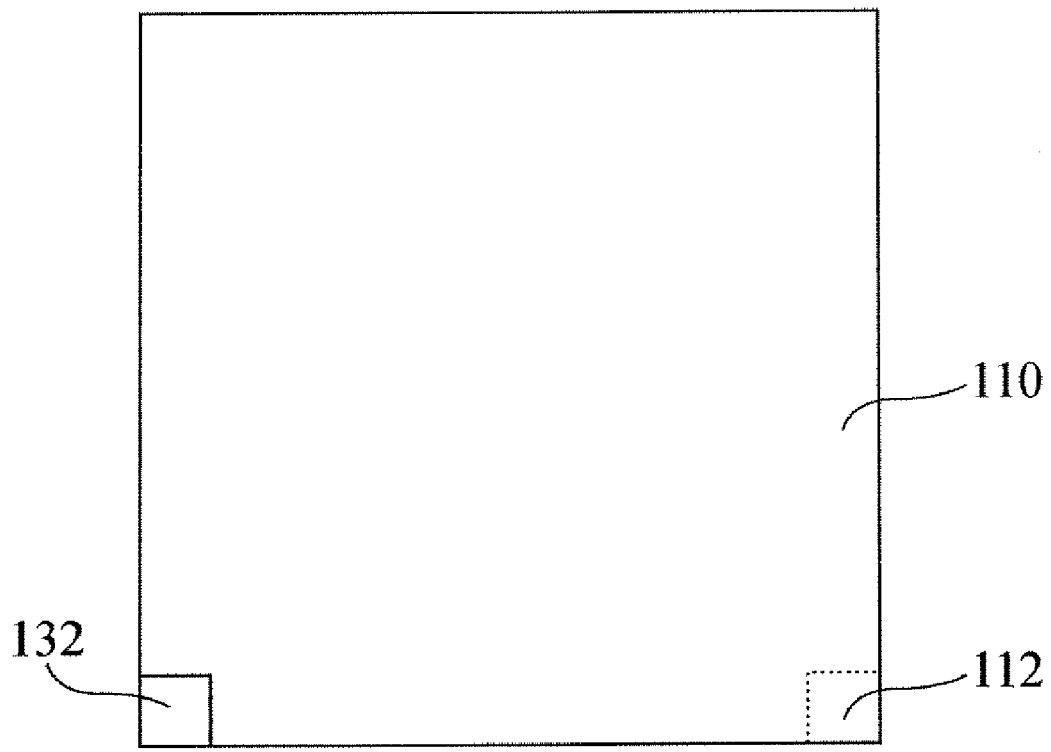
FIG. 1A shows a top view of an electrochemical device according to an exemplary embodiment of the present invention.
Figure 1B:
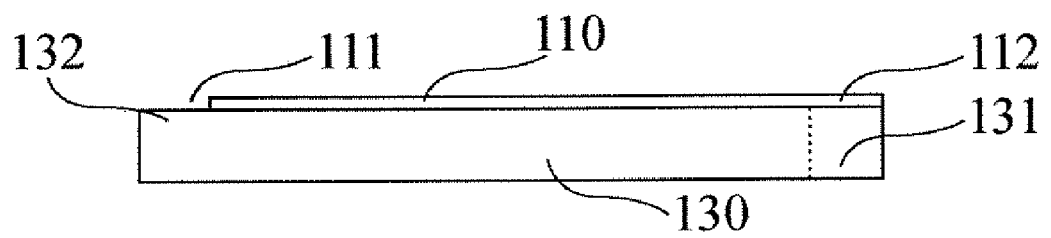
FIG. 1B shows a side view of an electrochemical device according to an exemplary embodiment of the present invention.

FIG. 1A shows a top view of one exemplary embodiment. FIG. 1B shows a side view of this embodiment. As shown in the figures, this embodiment comprises an electrochemical device 130 and a metal encapsulation layer 110. The electrochemical device 130 may comprise any number of materials or layers. The electrochemical device 130 may also comprise a battery. For example, the electrochemical device 130 may comprise an anode, cathode, electrolyte, current collectors, substrate, etc. Some materials may, for example, comprise Lithium, $LiCoO_2$, LIPON, gold, platinum, stainless steel, titanium, zirconium, cobalt, aluminum, indium, nickel, copper, silver, carbon, bronze, brass, beryllium, and/or oxides, nitrides, and alloys thereof. Furthermore, the electrochemical device 130 may be a thick film device.

The metal foil may, for example, be less than 100 microns in thickness. In another embodiment the metal foil may be less than 50 microns and in a specific embodiment the metal foil may be less than 25 microns.

The electrochemical device 130 may comprise at least one notch 131. The electrochemical device 130 shown in FIGS. 1A, 1B, 2A and 2B comprises a single notch 131, and the encapsulation layer 110 also includes a notch 111. These notches 111, 131 may be of any shape or size. The electrochemical device 130 or the encapsulation layer 110 may comprise any number of notches. The metal encapsulation layer 110 extends over the notch 131 in the electrochemical device 130 providing an encapsulation contact tab 112. This contact tab 112 extends over the open area left by the notch 131. The contact tab 112 may provide a convenient electrically conductive contact for the device. In a similar fashion, the electrochemical device may extend under the notch 111 in the metal encapsulation layer 110 providing a contact tab 132.

Figure 2A:
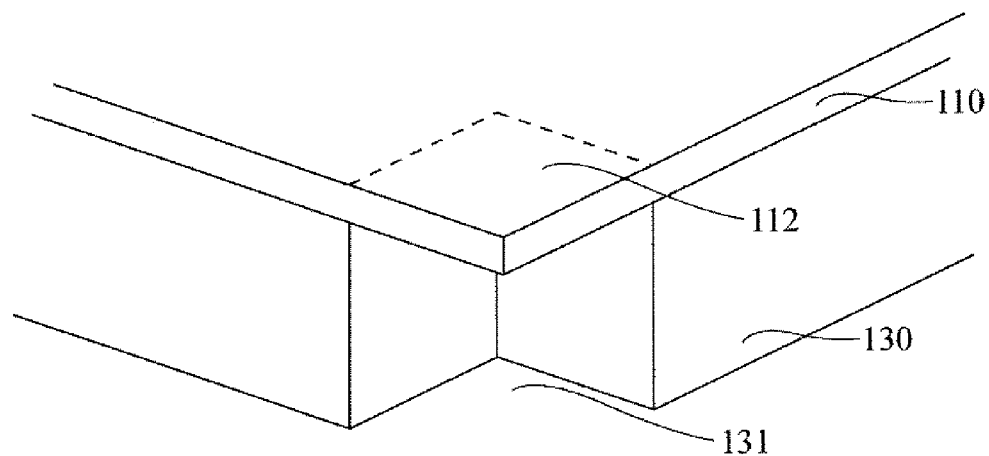
FIG. 2A shows a perspective view of one corner of an electrochemical device with a notch in the electrochemical device according to an exemplary embodiment of the present invention.
Figure 2B:
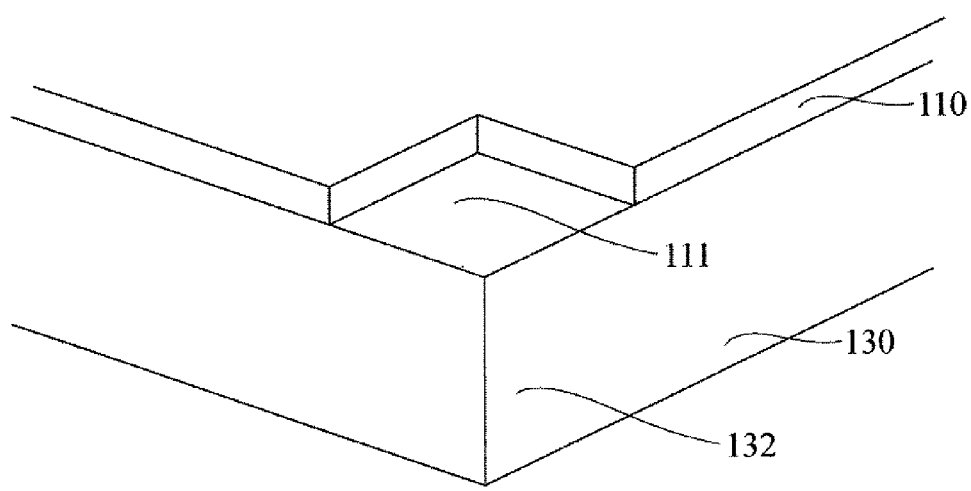
FIG. 2B shows a perspective view of one corner of an electrochemical device with a notch in the encapsulation layer according to an exemplary embodiment of the present invention.

FIG. 2A and FIG. 2B show perspective views of the embodiment shown in FIG. 1A and FIG. 1B. FIG. 2A shows an electrochemical device 130, a metal encapsulating layer 110, a notch 131 in the electrochemical device 130, and a contact tab 112 in the encapsulation layer 110. FIG. 2B shows an electrochemical device 130, a metal encapsulating layer 110, a notch 111 in the encapsulation 110 and the contact tab 132 in the electrochemical device 130. Although these figures show notches 131, 111 on the corner of the device, they may be in any location. One such exemplary configuration is shown in FIG. 7A with a notch on the side of the device. Also, the notch is not necessarily square. For instance, the notch shown in FIG. 7A is round, whereas those shown in FIGS. 1A, 1B, 2A and 2B are rectangular notches.

The metal foil layer 110 may be adapted to encapsulate the electrochemical device 130. This encapsulation may, for example, protect the electrochemical device 130 from damaging environmental effects. For example, many electrochemical devices comprise environmentally sensitive materials such as Lithium. These materials can be extremely reactive with air and moisture, and may degrade when exposed to such environments. Accordingly, the metal foil encapsulate layer 110 may protect environmentally sensitive materials in the electrochemical device from air and/or moisture.

The metal foil encapsulate layer 110 in an exemplary embodiment of the present invention may lie over a substrate layer in the electrochemical device 130. An electrochemical device may include a number of layers, for example, a substrate, cathode, electrolyte, and anode. Such a device may be encapsulated with a metal foil deposed on the substrate, and may also include contact tabs. The metal foil, therefore, may provide contacts that are secure, durable and may be incorporated at any location in the device. Because the contacts are part of the metal foil, they are less likely to break or shear from the substrate.

The metal foil layer, in an exemplary embodiment of the present invention, may comprise the cathode.

Figure 3A:
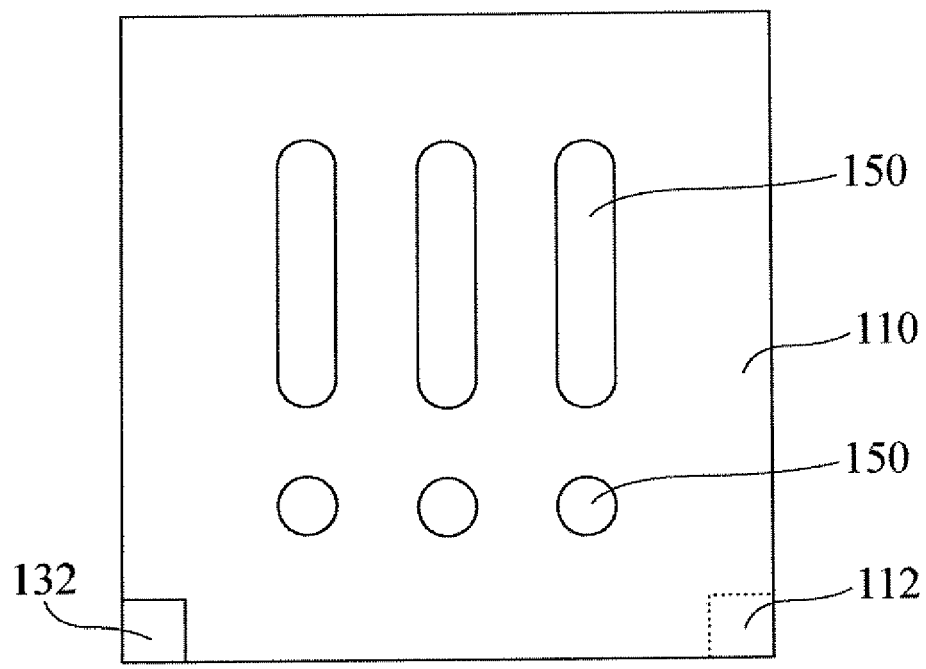
FIG. 3A shows a top view of an electrochemical device with a configuration of holes in the metal encapsulation according to an exemplary embodiment of the present invention.
Figure 3B:
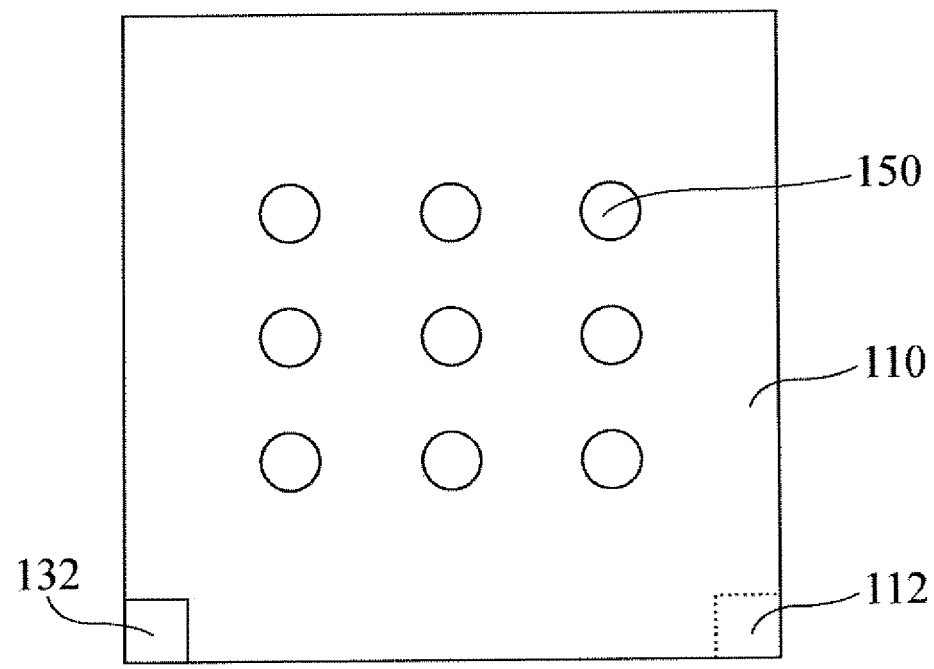
FIG. 3B shows a top view of an electrochemical device with another configuration of holes in the metal encapsulation according to an exemplary embodiment of the present invention.

FIG. 3A and FIG. 3B show top views of an exemplary embodiment of the present invention. In this embodiment, the metal foil encapsulation 110 comprises openings 150. These openings 150 may, for example, provide contact or access to layers in the electrochemical device. For example, these openings 150 may provide direct access to the substrate in the electrochemical device. These openings 150 may be of any size or configuration. Shown in the figures are exemplary circle and oval openings. Depending on the application a plurality of openings may be required or a single opening may suffice.

Figure 9A:
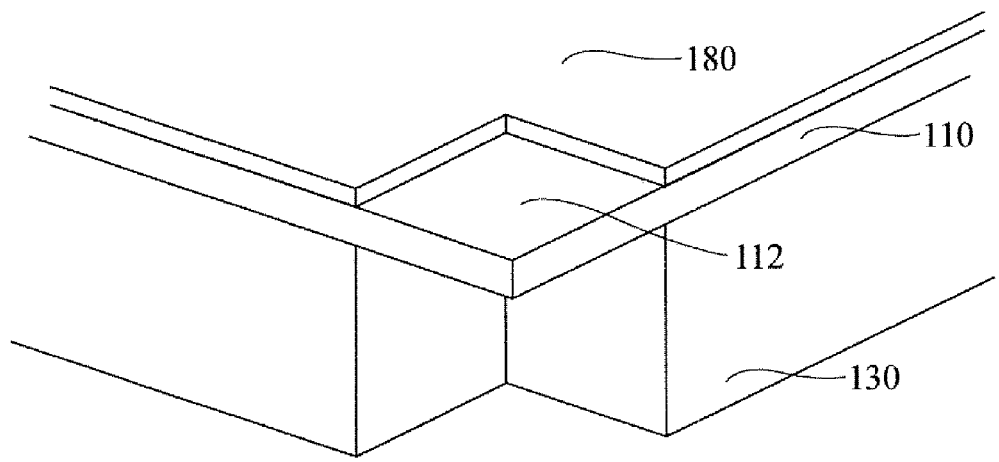
FIG. 9A shows the electrochemical device of FIG. 2A with an insulating layer according to an exemplary embodiment of the invention.
Figure 9B:
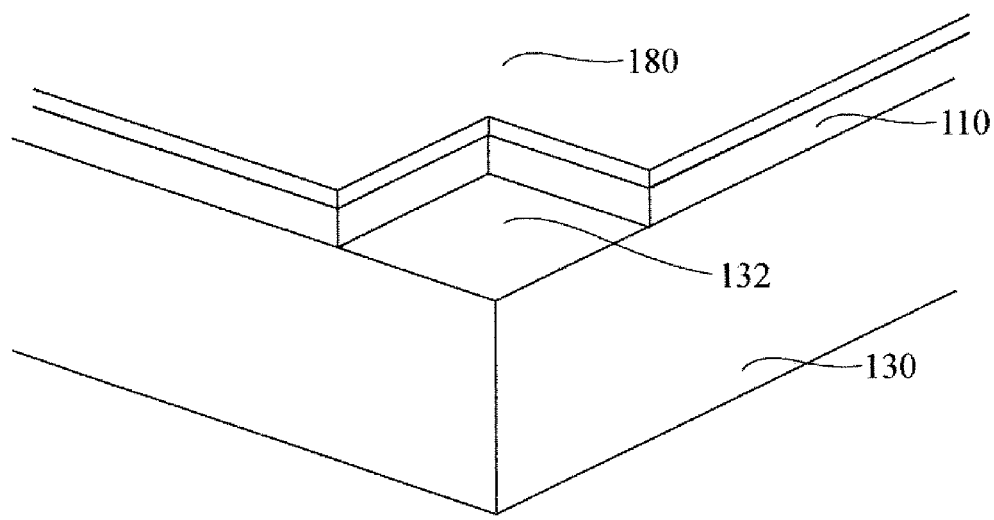
FIG. 9B shows the electrochemical device of FIG. 2B with an insulating layer according to an exemplary embodiment of the invention.

FIG. 9A shows the embodiment of FIG. 2A with an insulating layer 180 on the metal foil 110 and FIG. 9B shows the embodiment of FIG. 2B with an insulating layer 180 on the metal foil 110. The insulating layer 180 protects the metal foil 110 from unwanted electrical contacts. In FIG. 9A and FIG. 9B the tab 112, 132 portions are the only portion that are not covered with the insulating layer 180 allowing electrical contact only on the tabs 112, 132.

Figure 4A:
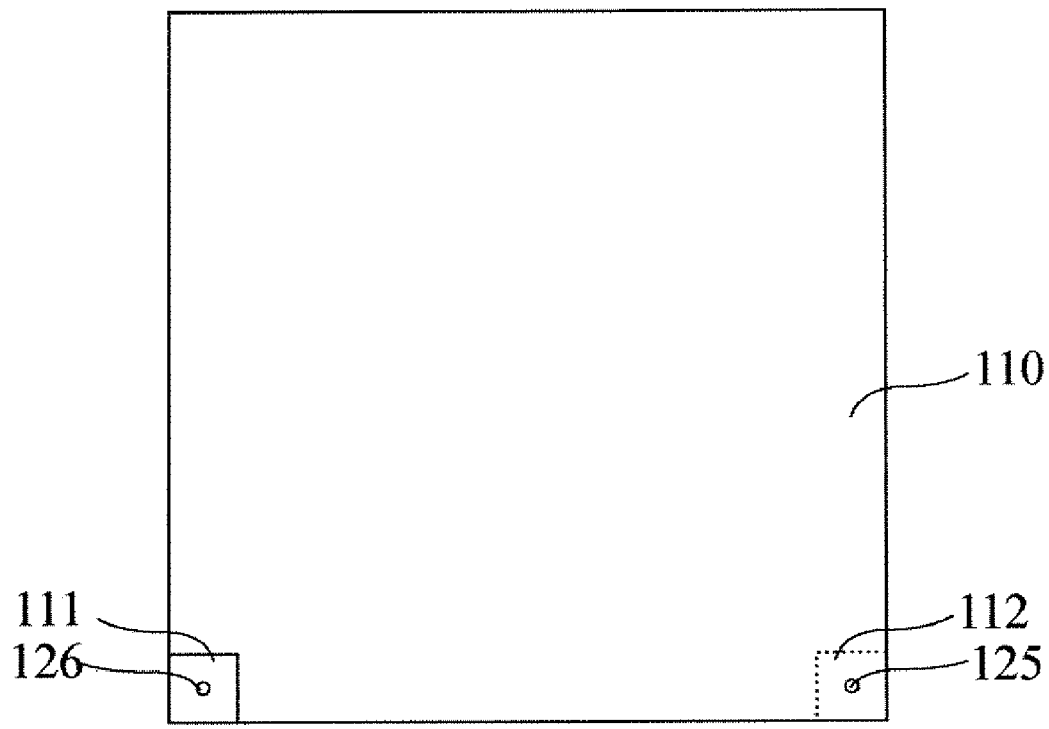
FIG. 4A shows a top view of an electrochemical device with holes in the contacts according to an exemplary embodiment of the present invention.
Figure 4B:
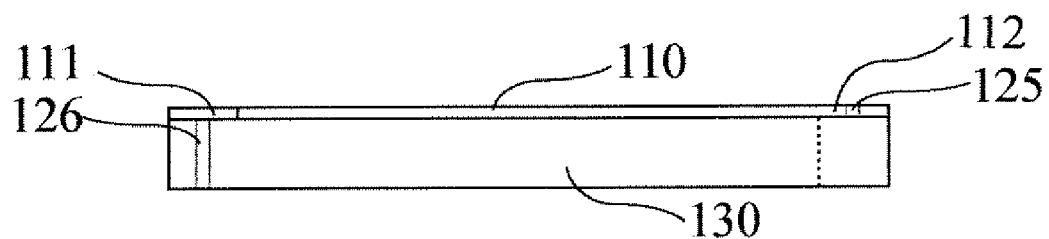
FIG. 4B shows a side view of an electrochemical device with holes in the contacts according to an exemplary embodiment of the present invention.

FIG. 4A and FIG. 4B show an exemplary embodiment of the present invention. This embodiment comprises a hole 126 in the contact tab 132 and a hole 125 in the encapsulate tab 112. Accordingly, these holes 125, 126 may, for example, provide a more secure contact point. Other devices may grip the contact through holes 125, 126.

Figure 5A:
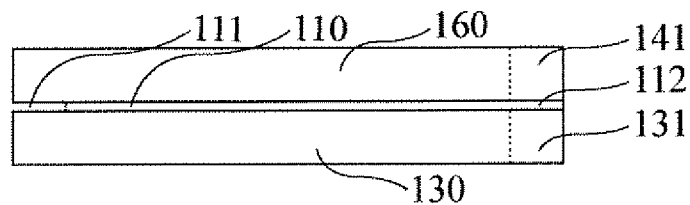
FIG. 5A shows a side view of an electrochemical device with an electrochemical device on each side of the metal film encapsulation according to an exemplary embodiment of the present invention.
Figure 5B:
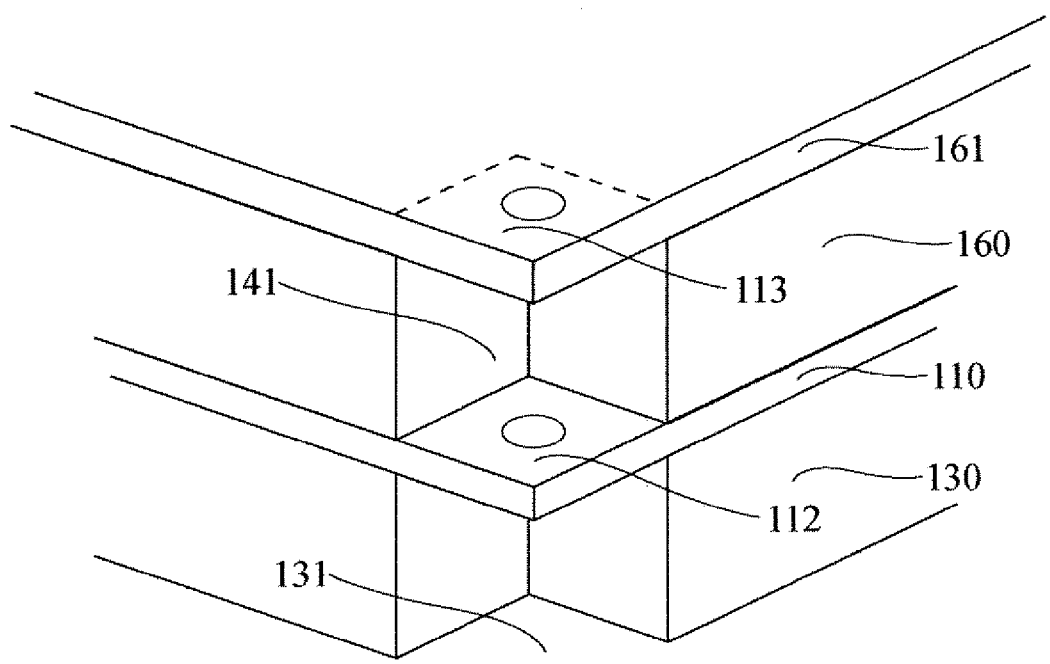
FIG. 5B shows a perspective view of an electrochemical device with an electrochemical device on each side of the metal film encapsulation according to an exemplary embodiment of the present invention.
Figure 5C:
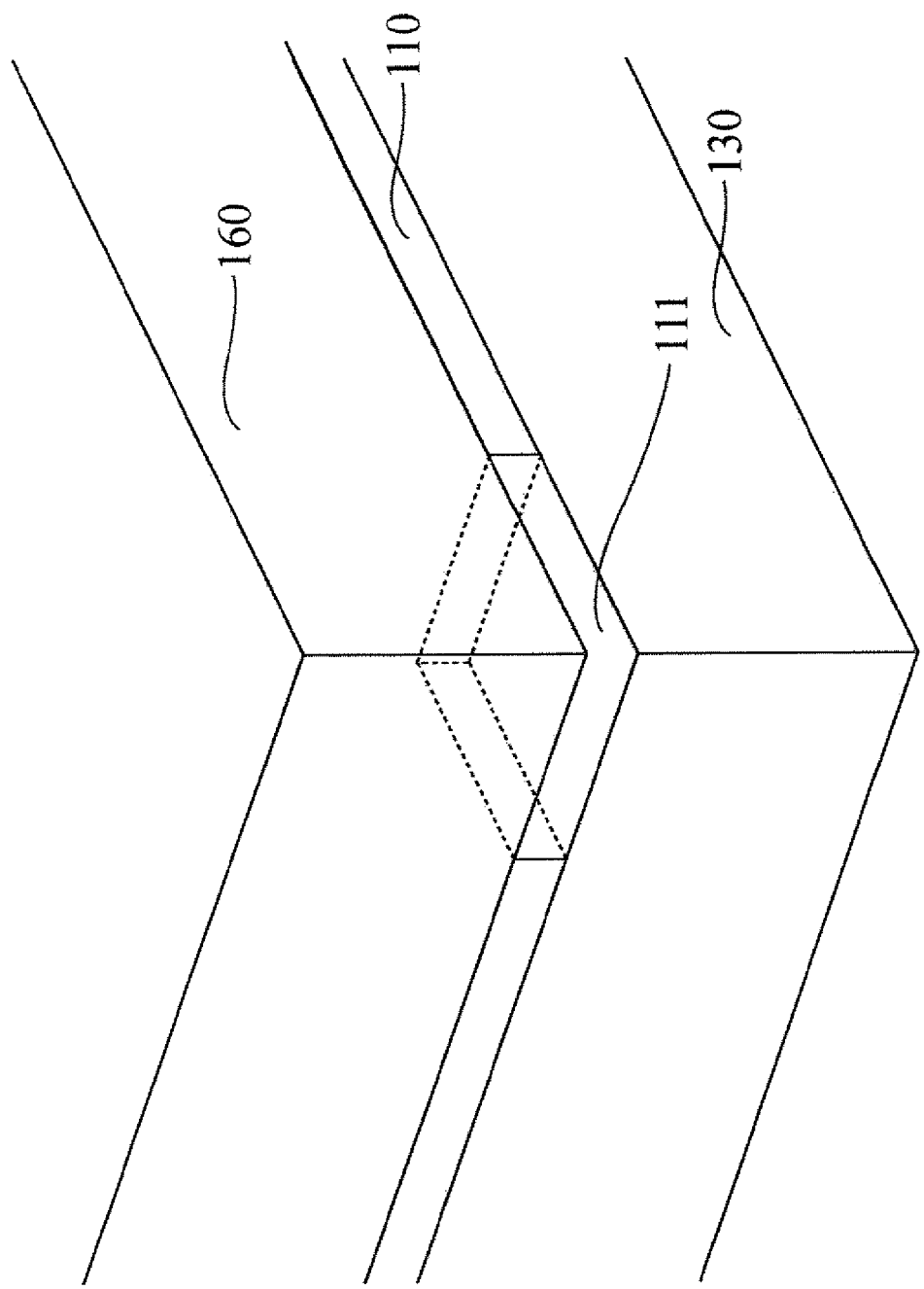
FIG. 5C shows a perspective view of an electrochemical device with a notched metal film encapsulation between two devices according to an exemplary embodiment of the present invention.
Figure 10:
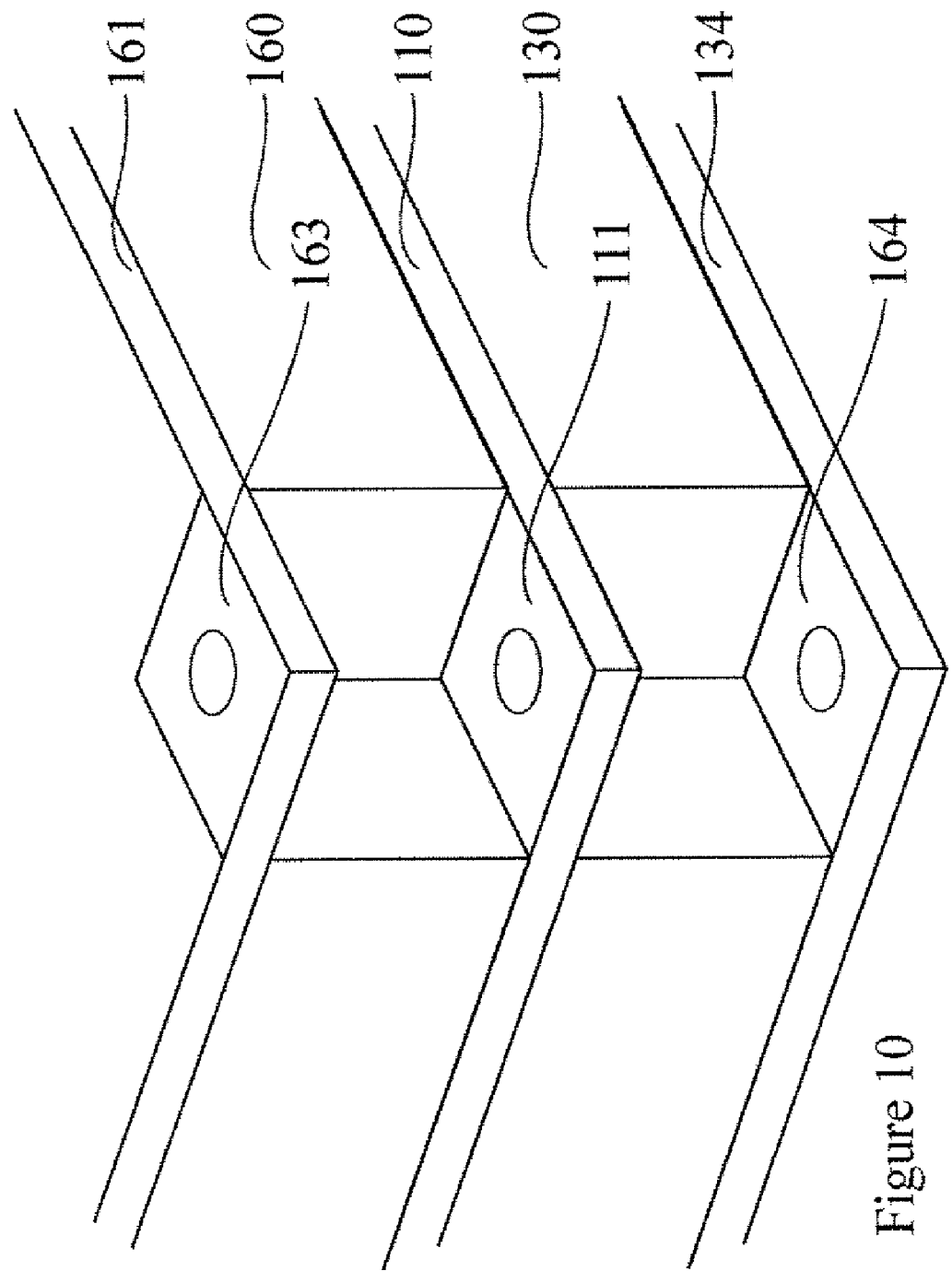
FIG. 10 shows two electrochemical devices with three metal foils according to an exemplary embodiment of the invention.

FIG. 5A, FIG. 5B, and FIG. 5C show an exemplary embodiment of the present invention. This embodiment comprises two electrochemical devices 130, 160 with a single metal foil encapsulation layer 110 between the two devices. In this embodiment, for example, the metal foil 110 may comprise the cathode for both electrochemical devices 130, 160. Furthermore, in another embodiment the metal foil 110 may be electrically conductive to the substrate of the electrochemical devices 130, 160. This embodiment may also include an encapsulation layer 161 on the top of electrochemical device 160 as shown in FIG. 5B. In FIG. 10 a third metal foil 134 is also included.

FIG. 5B is a perspective view of the right side of FIG. 5A with a second encapsulation layer 161. As shown the two electrochemical devices 130, 160 have notches 131, 141 and there is an extending tab 112 in the encapsulate layers 110, 113.

FIG. 5C is a perspective view of the left side of FIG. 5A and shows a notch 111 in the encapsulate 110 and tabs in both electrochemical devices.

Figure 6:
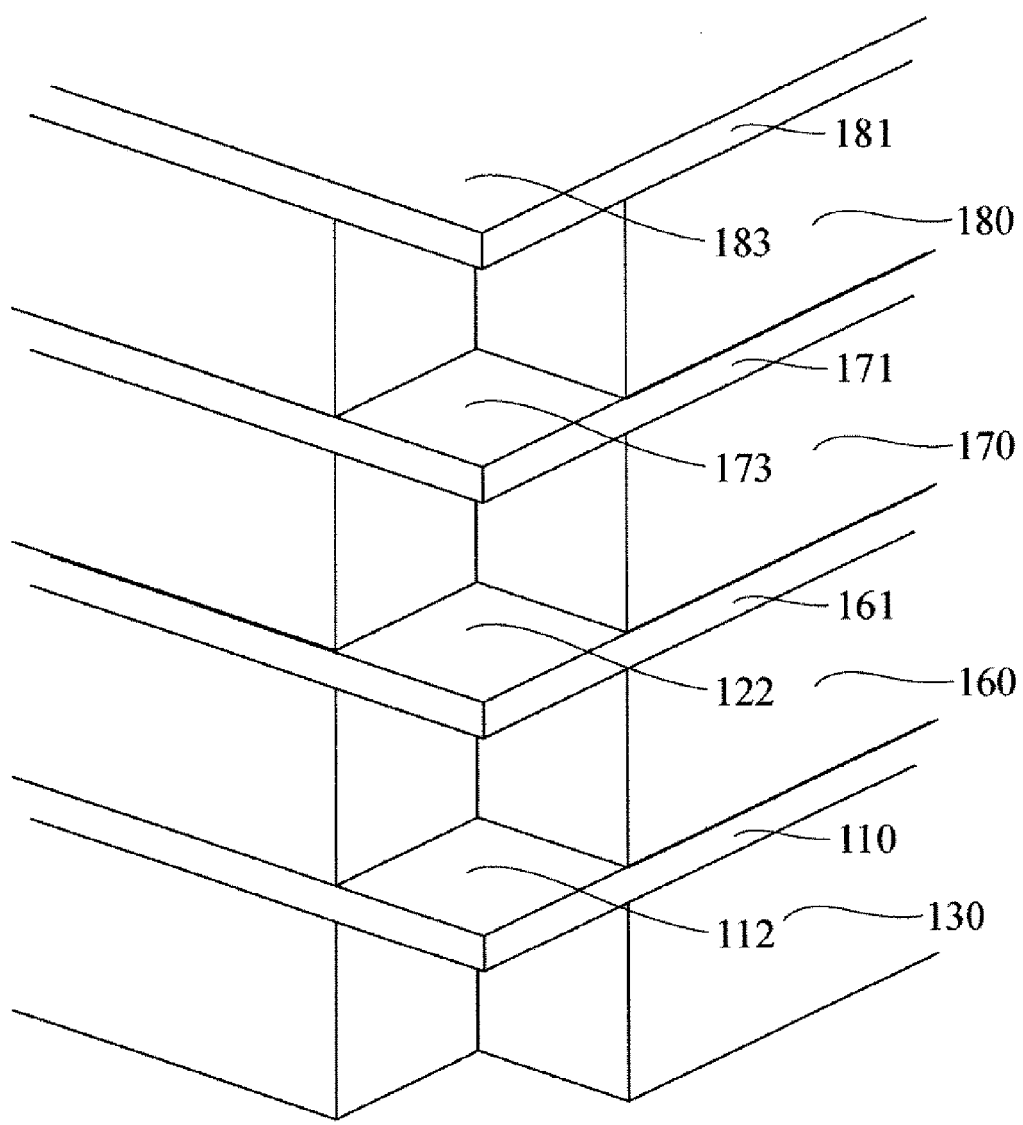
FIG. 6 shows a plurality of electrochemical devices stacked with metal foil in between according to an exemplary embodiment of the present invention.

FIG. 6 shows a plurality of electrochemical devices 130, 160, 170, 180 stacked one upon another with metal foil layers 110, 161, 171 between and a metal encapsulate 181 on the top. Although this figure shows four electrochemical devices 130, 160, 170, 180, the invention is not limited by the number of devices that may be stacked. Any number of devices may be stacked without deviating from the invention. This embodiment also shows four tabs 112, 122, 173, 183 in the encapsulation layers.

Figure 7:
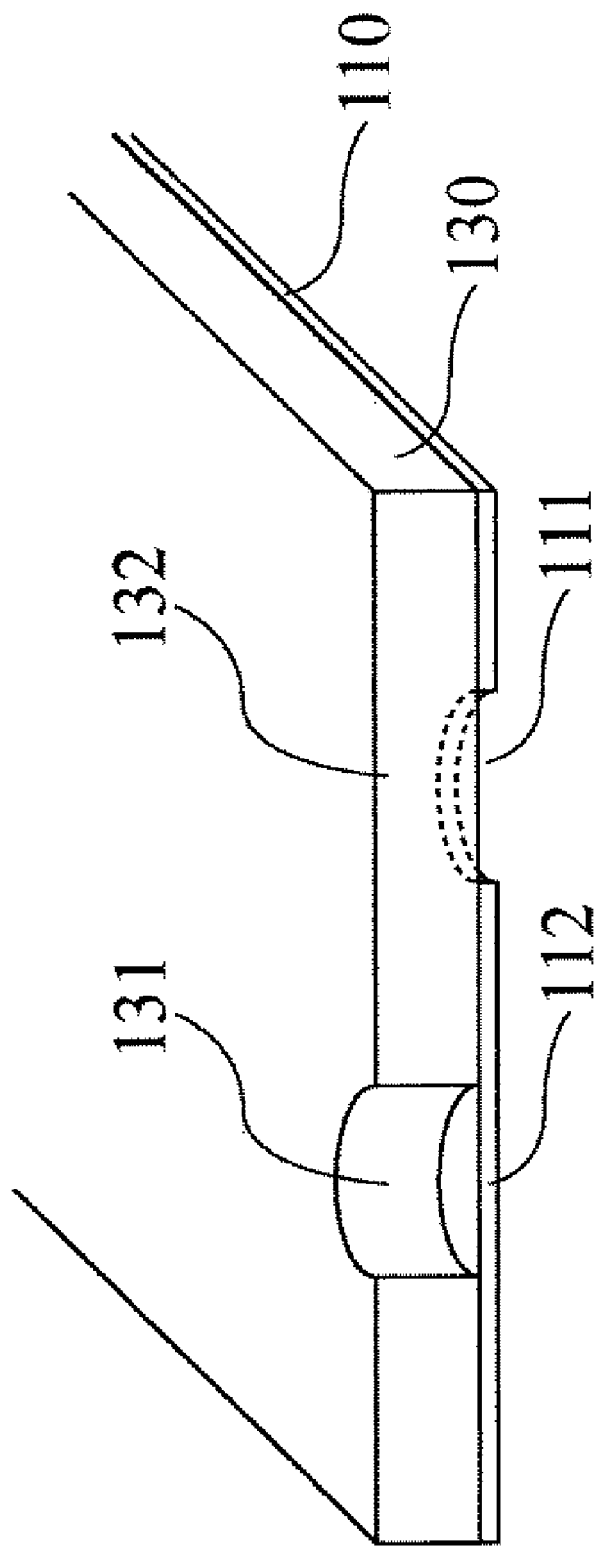
FIG. 7 shows an electrochemical device with a notch and tab on the side of the electrochemical device according to an exemplary embodiment of the invention.

FIG. 7 shows an exemplary embodiment of the present invention. In this embodiment an electrochemical device 130 has a notch 131 and a tab 132. On the bottom of the electrochemical device 130 is an encapsulation layer 110, which includes a tab 112 and a notch 111. The notches 111, 131 are circular and placed on the same side of the device.

Figure 8:
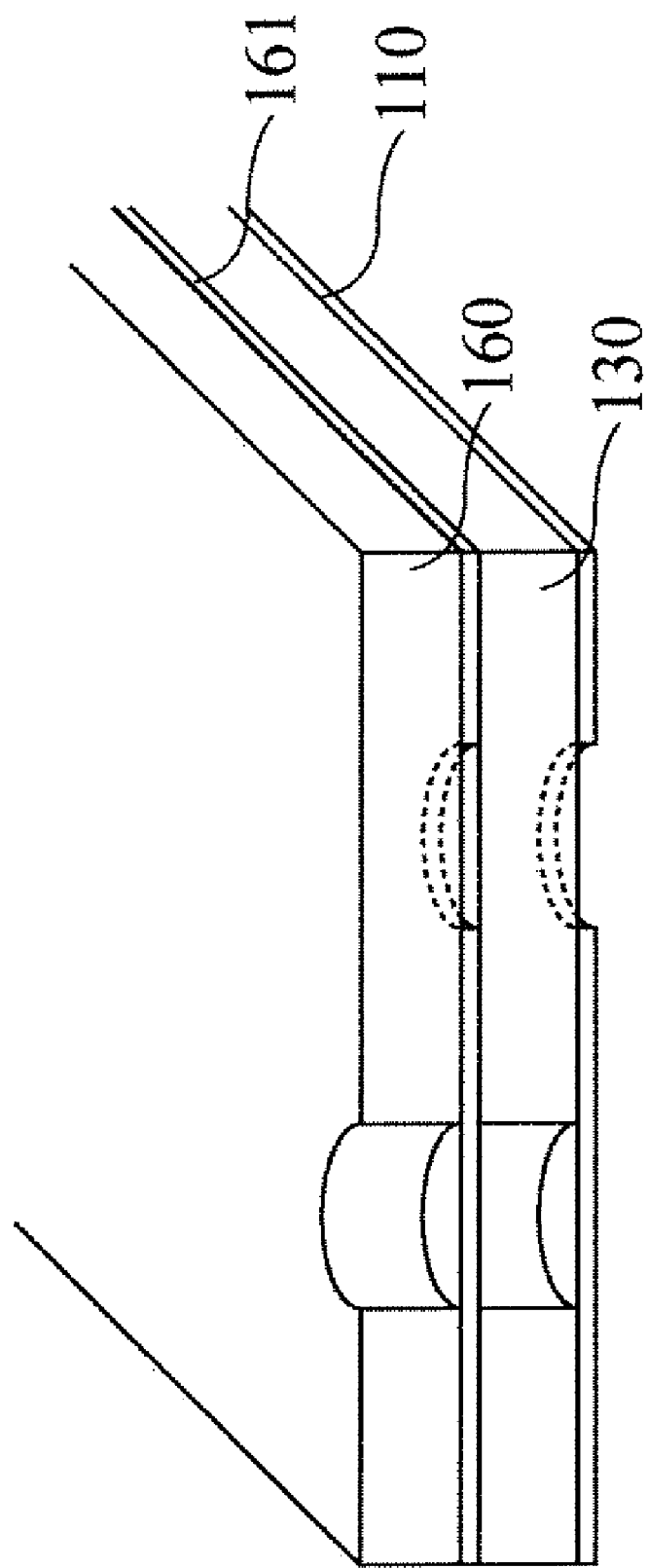
FIG. 8 shows an electrochemical device with a substrate, cathode, electrolyte, anode and a metal foil encapsulation according to an exemplary embodiment of the invention.

FIG. 8 shows a embodiment similar to that shown in FIG. 7 with circular notches in both the encapsulate 110 and the electrochemical cell 130. This exemplary embodiment shows a second electrochemical device 160 and a second encapsulation layer 161.

In an exemplary embodiment of the present invention, a metal foil may lay over an electrochemical device. This metal foil encapsulates the electrochemical device and protects it from environmental harm. The metal foil also provides tabs that are conductively contacted with the substrate of the device.

In an exemplary embodiment of the present invention, the electrochemical device comprises $LiCoO_2$. In this embodiment, the device is treated with a rapid thermal anneal. For example, the device is brought up to approximately 700° C. over a period of six minutes. The device is then held at this temperature for approximately five minutes and then quickly cooled to room temperature in about six minutes. This rapid thermal annealing crystallizes the $LiCoO_2$ so that it may be used without a barrier layer. The period of time may vary up to 30 minutes or even down to 10 seconds.

Figure 11A:
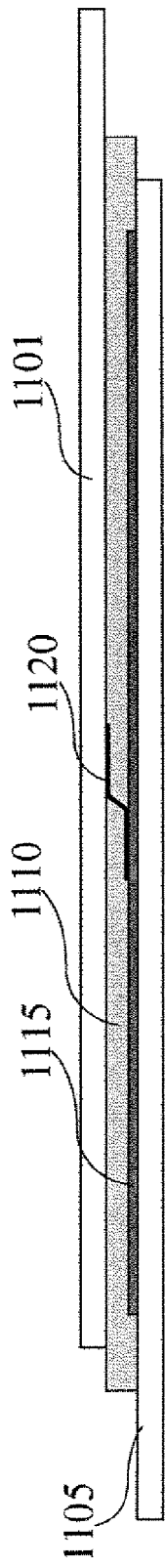
FIG. 11A shows a side view electrochemical device with electrical contacts as an encapsulate and substrate according to an exemplary embodiment of the present invention.

FIG. 11A shows a side view of an electrochemical device according to an exemplary embodiment of the present invention. In this embodiment, a first contact 1101 is coupled with bonding layer 1110 with a portion of the first contact 1101 extending past the bonding layer 1110. The bonding layer 1110 may also be bonded with the cell structure 1115. A second contact 1105 is placed under the cell structure 1115. A barrier layer, for example, may also be placed between the second contact 1105 and the cell structure 1115. Shown embedded within the bonding layer 1110 is conductor 1120. This conductor 1120, for example, creates a selectively conductive bonding layer. A selectively conductive bonding layer 1110 permits conduction from the cell structure 1115 through the bonding layer 1110 to the first contact 1101 at specific points, and yet provides insulation between the first contact 1101 and the second contact 1105.

The conductor 1120 may be placed within the bonding layer 1110 in many different ways. For example, a metal tab, a metal wire, multiple metal wires, a metal wire mesh, perforated metal foil, perforated metal, a metal coating applied to the adhesive layer, a metallic disk, a metallically coated fiberglass or combinations thereof may be used. In each of these examples, the conductor 1120 can provide electrical conduction between the cell structure 1115 and the first contact 1101 and yet provide insulation between the two contacts 1101, 1105. In some embodiments the conductor 1120 may be woven within the bonding layer 1110. The conductor 1115 may be, for example, disks embedded within the bonding layer 1110. In some embodiments slits within the bonding layer 1110 may be made in order to weave or place the conductor 1120 through the bonding layer 1110. Also, for example, holes or other means may be used to place the conductor 1120 through the bonding layer 1110.

In an exemplary embodiment, a reinforcement layer may be placed within the insulating layer. For example, a fiberglass material may cover half of one surface of the insulating layer, woven through the layer and then cover the other half of the bonding layer. Such a layer of fiberglass without a conductive coating would insulate the materials placed between. The fiberglass may be coated in a localized area with a conductive material. Such conductive coatings can coat the fiberglass area at the top and bottom surface of the bonding layer. In such an embodiment, for example, the fiberglass would conduct between the upper contact and the cell. Conductive material may be disposed on the fiberglass using ink jet, silk screen, plasma deposition, e-beam deposition, spray and/or brush methods. Other materials may be used rather than fiberglass, such as, for example, KEVLAR®, plastic, glass or other insulating materials.

An exemplary embodiment of the present invention provides for selective contact between the first contact and the cell structure through holes in the bonding layer. In such an embodiment, holes in the bonding layer may allow the first contact and cell structure to remain in contact. The layers may be, for example, pressed together to create a contact. Alternatively, conductive glues or inks may be applied in or near the hole area in the bonding layer to make the contact between the layers. Lithium may also be used as a conductive material.

The conductor 1120, for example, may be made of gold, platinum, stainless steel, titanium, zirconium, cobalt, aluminum, indium, nickel, copper, silver, carbon, bronze, brass, beryllium, or oxides, nitrides, and alloys thereof.

Figure 11B:
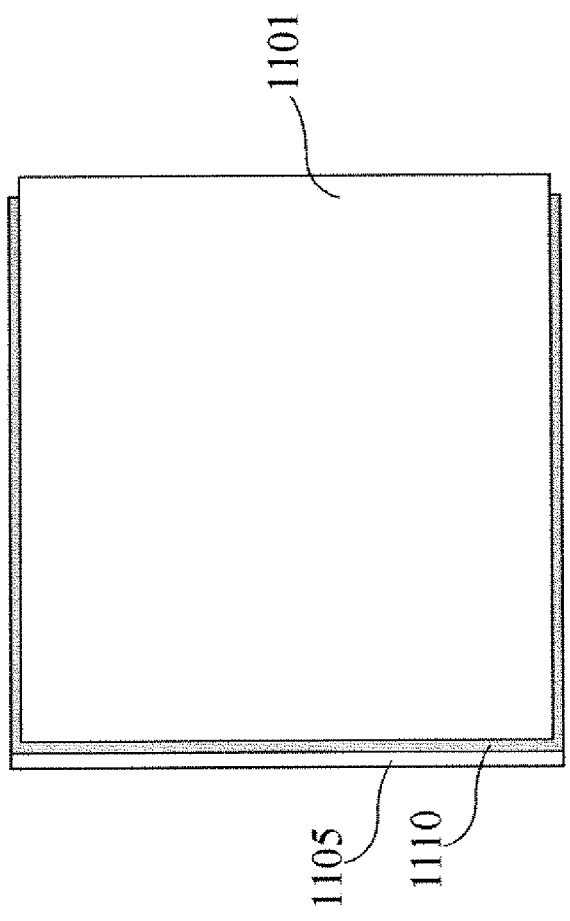
FIG. 11B shows a top view electrochemical device with electrical contacts as an encapsulate and substrate according to an exemplary embodiment of the present invention.

FIG. 11B shows a top view of the exemplary embodiment shown in FIG. 11A. As shown in FIG. 11B the first contact 1101 extends past the bonding layer 1110 and the second contact 1105. Likewise, for example, the second contact 1105 also extends past the boding layer 1115 and the first contact 1101 in the opposite direction.

Figure 11C:
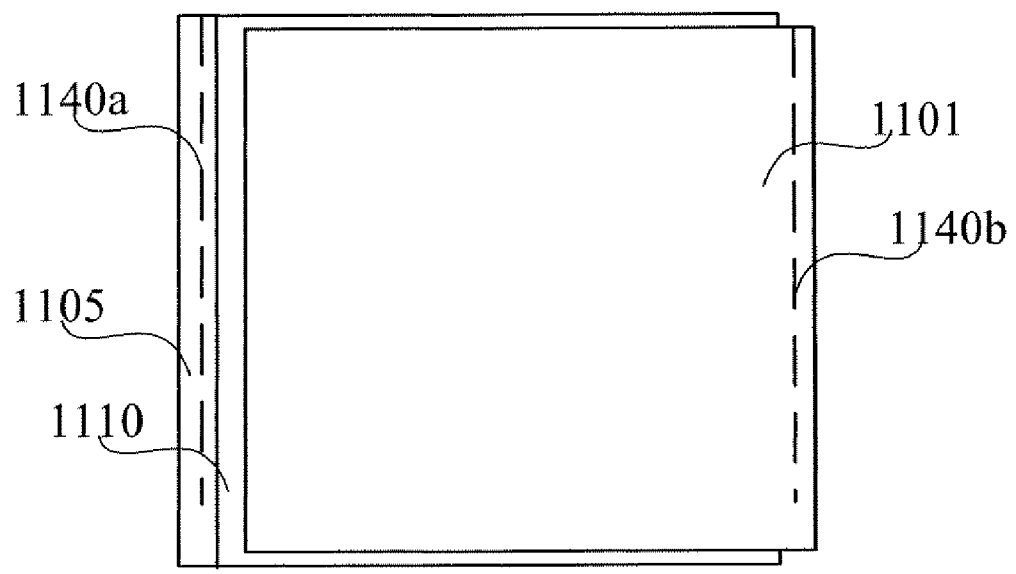
FIG. 11C shows a top view of the electrochemical device of FIG. 11B with partial cuts in the encapsulation according to an exemplary embodiment of the present invention.
Figure 11D:
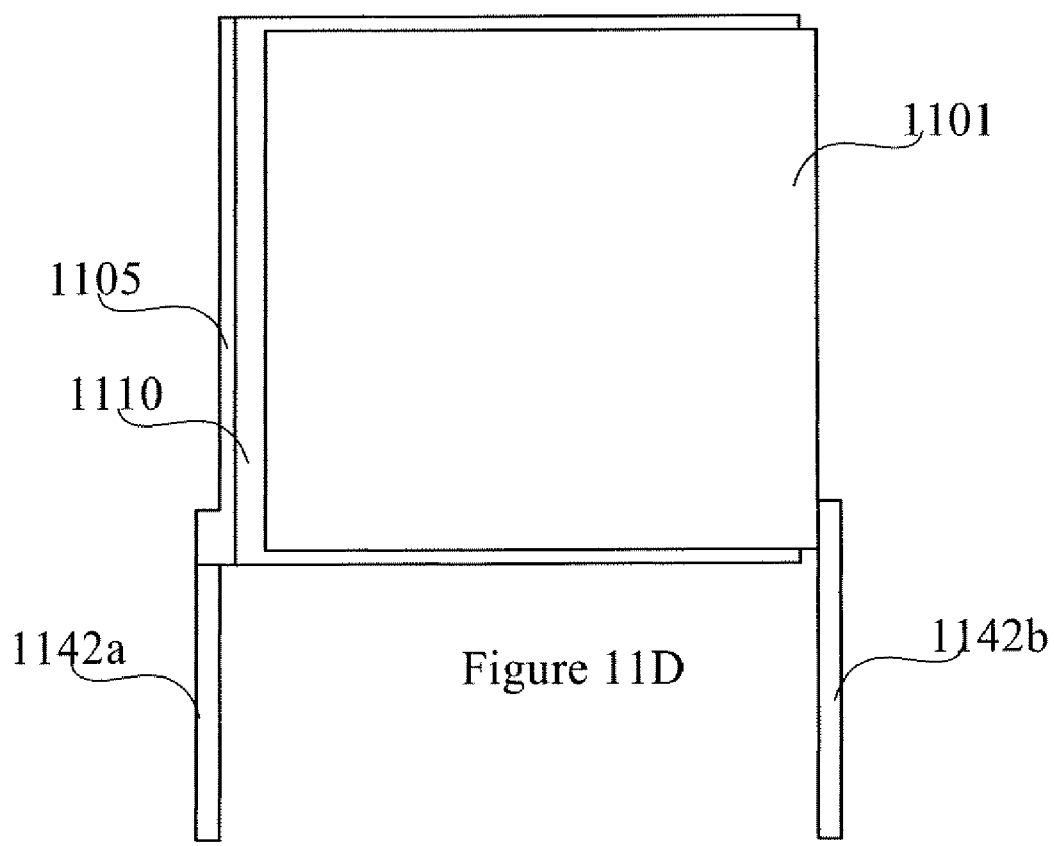
FIG. 11D shows a top view of the electrochemical device of FIG. 11C having resulting strips folded over according to an exemplary embodiment of the present invention.

FIGS. 11C and 11D show an exemplary embodiment in which leads are formed from the first and second contacts 1101, 1105. As shown in FIG. 11C, a first partial cut 1140a is made in the first contact 1101 and a partial cut 1140b is made in the second contact 1105. These partial cuts form strips that may be folded over to extend from the electrochemical device. For instance, FIG. 11D shows an example in which strips 1142a and 1142b resulting from the partial cuts in the contacts 1101, 1105 are folded in a downward direction of the drawing. It should be appreciated that only one or both of the extending parts of the contacts 1101, 1105 can be partially cut to form leads in a variety of ways for a desired application or orientation of the electrochemical device.

For purposes of explaining the exemplary embodiments shown in FIGS. 11A-11D, FIGS. 12A-19B show individual layers and parts of this embodiment and how they can be coupled or bonded together. These figures are not meant to show a step-by-step process for manufacturing any embodiments of the invention. Rather, these figures are presented to help understand how the layers interact. FIGS. 12A, 13A, 14A, 15A, 16A, 17A, 18A and 19A show side views of various parts of an exemplary battery, and FIGS. 12B, 13B, 14B, 15B, 16B, 17B, 18B and 19B show top views.

FIG. 12A shows a side view of a conductor 1120 according to one embodiment of the present invention. The top view of three exemplary types of conductors, a wire 1121, a tab 1122, and a wire mesh 1123, are shown in FIG. 12B. FIG. 13A shows a side view and FIG. 13B shows a top view of a slit 1130 cut within a bonding layer 1110. FIG. 14A shows a side view of a conductor 1120, for example, woven through the bonding layer. FIG. 14B shows a top view of a mesh wire conductor 1123 woven through the bonding layer 1110. FIG. 15A shows the conductor 1120 embedded within the bonding layer. The conductor 1120 may be embedded within the bonding layer 1110, for example, by heating the bonding layer 1110 to the point where the conductor 1120 may be pressed within the bonding layer 1110. The surfaces of the conductor 1120 and bonding layer 1110 may preferably be flush after this process. FIG. 15B shows a top view of a wire mesh conductor 1123 embedded within the bonding layer.

The resultant bonding layer 1110 from FIGS. 12A-15B show a bonding layer with insulating properties yet provides selective conductivity between the portions of the top surface and the lower surface of the bonding layer 1120. Other combination may also produce selective conductivity.

FIG. 16A and FIG. 16B show a first contact 1101. FIG. 17A shows the first contact 1101 bonded with the bonding layer 1110. Note that in this embodiment the conductor 1120 preferably makes electrical contact with the first electrical contact 1101. FIG. 17B, shows the top view of FIG. 17A. The first contact may also encapsulate the battery thereby protecting it from environmental degradation and damage. For example, many electrochemical devices comprise environmentally sensitive materials such as Lithium. These materials can be extremely reactive with air and moisture, and may degrade when exposed to such environments. Accordingly, the first contact 1101 may encapsulate the battery to protect it from environmentally sensitive materials in the electrochemical device from air and/or moisture.

FIG. 18A shows an exemplary embodiment of a single battery cell 1115 coupled with a second contact 1105. The second contact 1105 may also be the substrate upon which the cell is deposited. The cell structure in this embodiment comprises a cathode, and anode and an electrolyte. The electrolyte may include LIPON.

FIG. 19A shows a completed cell structure. The second contact 1105 and the cell structure 1115 from FIG. 18A are coupled with the first contact 1101 and the bonding layer 1110 as shown in 17A. Again, note how the conductor 1120 is preferably in electrical contact with the electrochemical device 1115 in a selective area. The cell is bounded by external contacts 1101 and 1105 with minimal layers there between. In this embodiment the first and second contacts 1101 and 1105 extend beyond the area of the electrochemical device 1115.

The first and second contacts 1101, 1105 of this embodiment can be made of a conductive metal. For example, the contact or contacts may be made of gold, platinum, stainless steel, titanium, zirconium, cobalt, aluminum, indium, nickel, copper, silver, carbon, bronze, brass, beryllium, or oxides, nitrides, and alloys thereof. Other conductive materials may also be used.

While the above examples show a conductive material 1120-1123 provided in an opening in the bonding layer 1110, such as the slit 1130 shown in FIG. 13b, it should be appreciated that electrical contact between the cell structure 1115 and first electrical contact 1101 may be provided by a number of other ways. For example, electrical conduction between the cell structure 1115 and the first contact 1101 may be provided by embedding a conductive powder within an adhesive forming the bonding layer 1110. For example, a conductive powder such as a metallic powder (e.g., nickel powder) can be embedded in an adhesive bonding layer 1110 at one or more selected areas within an adhesive bonding layer 1110 and between the contact 1101 and the cell structure 1115. Those skilled in the art will appreciate other conductive materials that may be provided for the selective conduction, such as conductive balls, slugs, wiring mesh etc. selectively provided within an adhesive. The ways to achieve electrical conduction between the cell structure 1115 and the first contact 1101, and yet provide insulation between the two contacts 1101, 1105, should not be considered as limited to the examples explained herein.

The embodiments described above are exemplary only. One skilled in the art may recognize variations from the embodiments specifically described here, which are intended to be within the scope of this disclosure. As such, the invention is limited only by the following claims. Thus, it is intended that the present invention cover the modifications of this invention provided they come within the scope of the appended claims and their equivalents.

What is claimed is:

1. A battery comprising:
   a first electrical contact;
   a bonding layer comprising an electronically insulating material coupled with said first electrical contact and comprising an embedded electronic conductor, wherein said embedded electronic conductor contacts said first electrical contact;
   a cell structure comprising a cathode, an electrolyte and an anode; and
   a second electrical contact,
   wherein said bonding layer and said cell structure are sandwiched between said first electrical contact and said second electrical contact.

2. The battery of claim 1, wherein said bonding layer is selectively conductive through said embedded electronic conductor.

3. The battery of claim 1, wherein said cell structure is in selective electrical contact with said first electrical contact via said embedded electronic conductor.

4. The battery of claim 1, wherein said first electrical contact further comprises a metal layer encapsulating a portion of said electrochemical device.

5. The battery of claim 1, wherein said second electrical contact further comprises a substrate.

6. The battery of claim 1, wherein said bonding layer comprises a material selected from the group comprising an adhesive material, an insulating material, plastic, glass, KEVLAR®, reinforcement materials, and fiberglass.

7. The battery of claim 1, wherein said embedded electronic conductor is selected from the group consisting of a tab, a wire, multiple wires, a wire mesh, perforated metal, a metal coating applied to said bonding layer, and a disk.

8. The battery of claim 1, wherein said embedded electronic conductor is woven within said bonding layer.

9. The battery of claim 8, wherein said bonding layer comprises a slit within which said embedded electronic conductor is woven.

10. The battery of claim 1, wherein said second contact comprises a material selected from the group consisting of gold, platinum, stainless steel, titanium, zirconium, cobalt, aluminum, indium, nickel, copper, silver, carbon, bronze, brass, beryllium, and oxides, nitrides, and alloys thereof.

11. The battery of claim 1, wherein said embedded electronic conductor comprises a material selected from the group consisting of gold, platinum, stainless steel, titanium, zirconium, cobalt, aluminum, indium, nickel, copper, silver, bronze, brass, beryllium, and oxides, nitrides, and alloys thereof.

12. The battery of claim 1 further comprising an insulating layer on said first contact.

13. The battery of claim 12 wherein said insulating layer comprises plastic.

14. The battery of claim 1 further comprising an insulating layer on said second contact.

15. The battery of claim 14 wherein said insulating layer comprises plastic.

16. The battery of claim 1 wherein said cathode is not annealed.

17. The battery of claim 1 wherein said cathode is annealed via rapid thermal anneal.

18. The battery of claim 1 further comprising a barrier layer between said cell structure and said second contact.

19. The battery of claim 1 further comprising a contact area in said first electrical contact.

20. The battery of claim 19 wherein said contact area in said first electrical contact further comprises a lead extending from said first electrical contact.

21. The battery of claim 1 further comprising a contact area in said second electrical contact.

22. The battery of claim 21 wherein said contact area in said second electrical contact further comprises a lead extending from said second electrical contact.

23. The battery of claim 1 further comprising at least one opening in first contact.

24. The battery of claim 1 wherein said first contact comprises a metal foil.

25. The battery of claim 1 wherein said second contact comprises a metal foil.

26. The battery of claim 1 further comprising a plurality of openings in said first contact.

27. The battery of claim 1 further comprising a second cell structure.

28. The battery of claim 24 wherein said battery further comprises a second cell structure having at least one notch and said metal foil also encapsulates said second cell structure with at least one notch, and a portion of said first contact extends over said notch providing an electrical contact tab on said first contact over the notch of said cell structure.

29. The battery of claim 1 wherein the first contact acts as a cathode element of said cell structure.

30. The battery of claim 1 wherein the first contact acts as an anode element of said cell structure.

31. The battery of claim 1 further comprising a plurality of cell structures with at least one notch in each cell structure, and stacked one upon another with at least one metal foil encapsulating each cell structure.

32. The battery of claim 1 wherein said first contact lays over said electrochemical device.

33. The battery of claim 1 wherein said first contact comprises stainless steel.

34. The battery of claim 1 wherein a portion of said first contact is coated with an insulating material.

35. The battery of claim 1 wherein said first contact is less than approximately 100 microns thick.

36. The battery of claim 1 wherein said first contact is less than approximately 50 microns thick.

37. The battery of claim 1 wherein said first contact is less than approximately 25 microns thick.

38. A battery comprising:
a first electrical contact having a contact area and a lead extending from said contact area;
a bonding layer comprising means for electronically conducting between said bonding layer and first electrical contact;
a cell structure comprising a cathode, an electrolyte and an anode; and
a second electrical contact,
wherein said bonding layer and said cell structure are sandwiched between said first electrical contact and said second electrical contact.

39. A battery comprising:
a first electrical contact;
a bonding layer comprising means for electronically conducting between said bonding layer and first electrical contact;
a cell structure comprising a cathode, an electrolyte and an anode; and
a second electrical contact having a contact area and a lead extending from said second electrical contact,
wherein said bonding layer and said cell structure are sandwiched between said first electrical contact and said second electrical contact.

40. A battery comprising:
a first electrical contact having at least one opening;
a bonding layer comprising means for electronically conducting between said bonding layer and first electrical contact;
a cell structure comprising a cathode, an electrolyte and an anode; and
a second electrical contact,
wherein said bonding layer and said cell structure are sandwiched between said first electrical contact and said second electrical contact.

41. A battery comprising:
a first electrical contact having a plurality of openings;
a bonding layer comprising means for electronically conducting between said bonding layer and first electrical contact;
a cell structure comprising a cathode, an electrolyte and an anode; and
a second electrical contact,
wherein said bonding layer and said cell structure are sandwiched between said first electrical contact and said second electrical contact.

42. A battery comprising:
a first electrical contact;
a bonding layer comprising means for electronically conducting between said bonding layer and first electrical contact;
a cell structure comprising a cathode, an electrolyte and an anode;
a second cell structure having at least one notch and a portion of said first electrical contact extending over said notch providing an electrical contact tab on said first electrical contact;
a metal foil that encapsulates said second cell structure; and
a second electrical contact,
wherein said bonding layer and said cell structure are sandwiched between said first electrical contact and said second electrical contact.

43. The battery of claim 42 wherein said contact tab is a lead extending from said battery.

44. The battery of claim 38 wherein the first contact acts as a cathode element of said cell structure.

45. A battery comprising:
a first electrical contact;
a bonding layer comprising means for electronically conducting between said bonding layer and first electrical contact.
a plurality of cell structures each comprising a cathode, an electrolyte, and an anode, each cell structure stacked upon one another with at least one metal foil encapsulating each cell structure;
at least one notch in each cell structure; and
a second electrical contact,
wherein said bonding layer and said plurality of cell structures are sandwiched between said first electrical contact and said second electrical contact.

* * * * *